US012759006B2

(12) United States Patent
Bierie

(10) Patent No.: US 12,759,006 B2
(45) Date of Patent: Oct. 13, 2026

(54) METHOD FOR GENERATING ROBOT PATH DATA TO AUTOMATICALLY COAT AT LEAST PART OF A SURFACE OF A SPATIAL SUBSTRATE WITH AT LEAST ONE COATING MATERIAL

(71) Applicant: BASF COATINGS GMBH, Muenster (DE)

(72) Inventor: William Bierie, Whitehouse, OH (US)

(73) Assignee: BASF COATINGS GMBH, Muenster (DE)

( * ) Notice: Subject to any disclaimer, the term of this patent is extended or adjusted under 35 U.S.C. 154(b) by 0 days.

(21) Appl. No.: 18/872,502

(22) PCT Filed: Jul. 4, 2023

(86) PCT No.: PCT/EP2023/068361
§ 371 (c)(1),
(2) Date: Dec. 6, 2024

(87) PCT Pub. No.: WO2024/008705
PCT Pub. Date: Jan. 11, 2024

(65) Prior Publication Data

US 2025/0353029 A1 Nov. 20, 2025

(30) Foreign Application Priority Data

Jul. 7, 2022 (EP) .................................... 22183585

(51) Int. Cl.
*B05B 13/04* (2006.01)
*B05B 5/00* (2006.01)
(Continued)

(52) U.S. Cl.
CPC ............ *B05B 13/0431* (2013.01); *B05B 5/00* (2013.01); *B05D 1/04* (2013.01); *B25J 9/1664* (2013.01); *B25J 11/0075* (2013.01)

(58) Field of Classification Search
CPC ...... B05B 13/0431; B05B 5/00; B25J 9/1664; B25J 9/16; B25J 9/22; B25J 11/0075; B05D 1/04
See application file for complete search history.

(56) References Cited

U.S. PATENT DOCUMENTS 9,764,470 B2 * 9/2017 Saboo .................... B25J 9/0084
11,285,616 B2 * 3/2022 Penning .................. B05B 16/40
(Continued)

FOREIGN PATENT DOCUMENTS

CN 107305370 A * 10/2017 ........... G05B 19/418
CN 112549014 A * 3/2021 ................ B25J 9/16
(Continued)

OTHER PUBLICATIONS

Gadow, R., et al., "Optimized robot trajectory generation for thermal spraying operations and high quality coatings on free-form surfaces". Surface & Coatings Technology 205 (2010) 1074-1079.*
(Continued)

*Primary Examiner* — Bret P Chen
(74) *Attorney, Agent, or Firm* — Armstrong Teasdale LLP

(57) ABSTRACT

A method for generating robot path data for robot path(s) to be followed by a robot includes a coating tool during coating of at least part of the surface of a spatial substrate with at least one coating material spatial substrate, as well as respective apparatuses, computer elements, and robotic systems. The methods, respective apparatuses, or computer elements allow automated application of coating materials to substrates having a high variation in geometry and provide consistency of application in contrast to manual application of coating materials, for example during repair processes of automotives or automotive parts, which is highly dependent on the painter performing the application.

13 Claims, 14 Drawing Sheets

(51) Int. Cl.

| | |
|---|---|
| ***B05D 1/04*** | (2006.01) |
| ***B25J 9/16*** | (2006.01) |
| ***B25J 11/00*** | (2006.01) |

(56) References Cited

U.S. PATENT DOCUMENTS

| | | | | |
|---|---|---|---|---|
| 2005/0256611 | A1* | 11/2005 | Pretlove | B25J 9/1664 700/264 |
| 2007/0282480 | A1* | 12/2007 | Pannese | G05B 15/02 700/245 |
| 2017/0095926 | A1* | 4/2017 | Saboo | G05D 1/0217 |
| 2019/0255551 | A1 | 8/2019 | Hargadon | |
| 2020/0078943 | A1* | 3/2020 | Song | G05D 1/0214 |
| 2020/0078954 | A1 | 3/2020 | Penning et al. | |
| 2023/0415186 | A1 | 12/2023 | Nolte et al. | |

FOREIGN PATENT DOCUMENTS

| | | | | | |
|---|---|---|---|---|---|
| CN | 115401673 | | * | 11/2022 | B25J 9/00 |
| DE | 112010000794 | B4 | * | 4/2019 | B25J 9/18 |
| EP | 1537959 | | * | 8/2005 | B25J 9/16 |
| JP | 2004209641 | | * | 7/2004 | B25J 9/22 |
| JP | 2007220128 | A | | 8/2007 | |
| JP | 2022080992 | A | | 5/2022 | |
| KR | 10-1257957 | | * | 4/2013 | B23K 9/04 |
| WO | WO 2005/074527 | A2 | * | 8/2005 | |
| WO | WO 2011/056633 | | * | 5/2011 | |
| WO | WO 2020/234008 | | * | 11/2020 | B05B 12/00 |

OTHER PUBLICATIONS

Seegmiller, Neal A, et al., "Precision Robotic Coating Application and Thickness Control Optimization for F-35 Final Finishes". SAE International, 2009-01-3280 (2009) pp. 1-6.*

Abdi, Ali, et al., "Computer Vision-Based Path Planning for Robot Arms in Three-Dimensional Workspaces Using Q-Learning and Neural Networks". Sensors, 2022, 22, 1697, pp. 1-17.*

Chen, Yuanyi, et al., "Research and Implementation of Robot Path Planning Based on Computer Image Recognition Technology". 2021 J. Phys.: Conf. Ser. 1744 022097, pp. 1-4.*

Mlakar, Roman, "Using Robot Application in Powder Coatings for Flexibility, Perfect Coating". Powder Coat, Feb. 15, 2022.*

International Search Report for PCT/EP2023/068361 dated Oct. 5, 2023, 3 pages.

Written Opinion for PCT/EP2023/068361 dated Oct. 5, 2023, 13 pages.

Nguyen et al., "Machine Learning and Deep Learning frameworks and libraries for large-scale data mining: a survey", Artificial Intelligence Review, vol. 52, pp. 77-124 (2019).

Sivasothy et al., "Proof of Concept: Machine learning based filling level estimation for bulk solid silos", Proceedings of Meetings on Acoustics, vol. 35, pp. 1-15 (2018).

* cited by examiner

METHOD FOR GENERATING ROBOT PATH DATA TO AUTOMATICALLY COAT AT LEAST PART OF A SURFACE OF A SPATIAL SUBSTRATE WITH AT LEAST ONE COATING MATERIAL

CROSS-REFERENCE TO RELATED APPLICATIONS

This application is a U.S. National Phase Application of International Patent Application No. PCT/EP23/68361, filed Jul. 4, 2023, which claims priority to European Patent Application No. 22183585.3, filed Jul. 7, 2022, each of which is hereby incorporated by reference herein.

FIELD

Aspects described herein generally relate to a method for generating robot path data for robot path(s) to be followed by a robot comprising a coating tool during coating of at least part of the surface of a spatial substrate with at least one coating material, and respective apparatuses, or computer elements. Moreover, aspects described herein generally relate to a robotic system for coating at least one surface of a spatial substrate with at least one coating material. More specifically, aspects described herein relate to methods and respective apparatuses, or computer elements for generating robot path data using color and geometry data of the spatial substrate as well as different rule sets containing rules for coating outer edges and edges adjacent to open space(s) and rules for coating main surfaces. The use of 3D data, which can be acquired by the robot using a scanning device attached to the robot, allows to determine the geometry and color of the spatial substrate to be coated right before the coating process and thus allows to generate robot path data for substrates showing a high level of variation in their geometry without requiring the presence of said data prior to performing the inventive method. Moreover, aspects described herein relate to a robotic system containing a computing apparatus generating the robot path data according to the inventive method and a robot apparatus receiving said robot path data and coating the spatial substrate in accordance with the received robot path data. The inventive methods, respective apparatuses, or computer elements allow to automate application of coating materials to substrates having a high variation in geometry and provides consistency of application in contrast to manual application of coating materials, for example during repair processes of automotives or automotive parts, which is highly dependent on the painter performing the application.

BACKGROUND

Vehicles, in particular land vehicles such as automobile, motorcycle and truck bodies, are normally treated with multiple layers of coatings which enhance the appearance of the vehicle and also provide protection from corrosion, scratch, chipping, ultraviolet light, acid rain and other environmental conditions. Multicoat paint systems comprising basecoat and clearcoat layer(s) for automobiles and trucks have been commonly used over the past two decades.

Producing these multicoat paint systems generally involves electrophoretically depositing an electrocoat material on a metallic substrate, such as an automobile body, and curing said applied electrocoat material. The metallic substrate may undergo various pretreatments prior to the deposition of the electrocoat material—for example, by applying known conversion coatings such as phosphate coatings, more particularly zinc phosphate coats. Afterwards, a filler or primer-surfacer material may be applied to the cured electrocoat and cured. In case such a layer is present, at least one basecoat material comprising color and/or effect pigments is applied to said cured layer. However, it is also possible to apply at least one basecoat material directly to the cured electrocoating layer. In case of plastic substrates, a primer material may be applied prior to the application of a basecoat material to increase adhesion of the multilayer coating to the substrate. The at least one basecoat film or the topmost basecoat film thus produced is then coated with a clearcoat material without separate curing. The clearcoat film and all basecoat film(s) present are then jointly cured (so-called 2 coat 1 bake (2C1B) or 3 coat 1 bake (3C1B) method).

When film defects, such as peeling, discoloration, scratching or the like, arise in such multicoat paint systems they are normally repaired to restore the original appearance of the vehicle. If such film defects occur directly after OEM finishing, they are repaired directly at the OEM manufacturing site in the so-called "OEM automotive refinishing". If such defects occur at a later point in time, they are normally repaired in vehicle repair shops in the so-called "automotive refinishing". Refinishing processes can be broadly classified as edge to edge repairs, blend-in processes, and spot repairs. Edge to edge repairs may be carried out when the part of the multilayer coating which is to be repaired is comparatively large and usually involve removing the damaged parts of the multilayer coating and refinishing the entire area. Spot repair is carried out when the part of the multilayer coating which is to be repaired is small or when the location of the part of the multilayer coating to be repaired is not in a prominent position.

Refinishing the entire area generally includes cleaning and sanding and, if necessary, filling the damaged area. Then, if necessary after further pretreatment, the damaged area and adjacent areas are usually coated with opaque coating agents, such as suitable basecoat materials. After drying the coating layer thus produced, the coating layer and the adjacent areas are usually coated with a clearcoat composition which is then dried together with the previously applied coating layer(s). In general, spot repairs involve sanding the spot, which is to be repaired, painting the surface with an opaque coating material, drying the applied coating material, sanding the applied coating material and applying a clearcoat material. In order to decrease a color mismatch of the repaired area or spot, the repair is "blended" out beyond the area or spot itself. This is a process of decreasing the paint film build of the applied coating layers while moving further away from the repaired area or spot. Thus, the color gradually changes from the (incorrect) color on the area or spot to the (correct) color of the rest of the area. If this change is gradual enough, human vision does not perceive the mismatch.

When not only the multilayer coating but also the underlying substrate is damaged, for example during an automotive accident, the damaged part has to be removed and a new part having the required color has to be attached during repair of the automotive. This requires coating of whole parts of the automotive with a multilayer coating prior to mounting said part(s) to the automotive.

The requirements nowadays imposed on the refinishing of vehicles are extremely high. In visual and technological terms, therefore, the finished result must be comparable with the baked original finish, i.e. the color of the repair must match that of the rest of the vehicle such that the repaired area is not distinguishable to the observer. Moreover, the mechanical properties of the repaired multilayer coating should be comparable to the mechanical properties of the original finish.

However, the resulting optical appearance of applied coating material(s) is highly dependent on the parameters used during application of the coating material(s), i.e. varying application conditions result in varying optical appearance of the painted automotive or automotive part. To reduce the influence of the application conditions on the resulting optical appearance of the coated substrate, robotic systems which automatically apply the coating material(s) to the substrate can be used. With robotic painting systems, a controller provides instructions (also called robot path data) to the robot causing the robot to coat the respective substrate according to the provided robot path data.

When generating complexly shaped robot movements for spatial substrates, such as automotives or parts thereof, the coating application should be as uniform and complete as possible. Generation of said complex robot movements can be performed automatically based on electronic data, such as CAD data, of the substrate and predefined painting rules for each type of substrate, for example automotive hood, automotive fender, automotive door, etc., However, said methods cannot be used for substrates where CAD data is not available, for example for substrates used in the automotive repair sector which have a high level of variation with regard to their geometry.

It would therefore be desirable to provide methods and systems which allow to automatically, i.e. without human interaction, generate robot path data for spatial substrates which have a high level of variation with regard to their geometry to allow consistency of coating material application and resulting optical coating quality.

SUMMARY

To address the above-mentioned problems in a perspective the following is proposed:

a computer-implemented method for generating robot path data for robot path(s) to be followed by a robot comprising a coating tool during coating at least part of the surface of at least one spatial substrate with at least one coating material, said method comprising the following steps:

(a) providing—via a communication interface-to at least one computer processor spatial substrate data for each spatial substrate including substrate classification data and data being indicative of the geometry and the color of each spatial substrate, and coating material data including data being indicative of the type of the at least one coating material and optionally of the order of the coating materials to be applied to each spatial substrate and/or data being indicative of the coating tool;

(b) optionally determining with the at least one computer processor whether each spatial substrate comprises at least one masking material based on the provided spatial substrate data;

(c) retrieving-via the communication interface-using the at least one computer processor, coating tool parameter data based on the provided coating material data, said coating tool parameter data including coating tool tolerance data and at least one application parameter associated with the at least one coating material, coating procedure data including a rule set for coating outer edges and edges adjacent to open space(s) and a rule set for coating main surfaces, and substrate type data based on the provided spatial substrate data, said substrate type data including a rule set for the type of spatial substrate matching the substrate classification data;

(d) generating—with the at least one computer processor-tool path data for tool path(s) to be followed by the coating tool along the surface of each spatial substrate based on the data retrieved in step (c) and optionally the result of the determination performed in step (b);

(e) generating—with the at least one computer processor—the robot path data based on tool path data generated in step (d); and (f) providing the generated robot path data via the communication interface.

Further disclosed is:

a method for coating at least part of a surface of a spatial substrate with a coating material using a robotic system comprising a robot containing a coating tool, said method comprising the following steps:

(a) providing—via a communication interface-to at least one computer processor spatial substrate data for the spatial substrate including substrate classification data and data being indicative of the geometry and the color of the spatial substrate, and coating material data including data being indicative of the type of the at least one coating material and optionally of the order of the coating materials to be applied to the spatial substrate and/or data being indicative of the coating tool;

(b) optionally determining with the at least one computer processor whether the spatial substrate comprises at least one masking material based on the provided spatial substrate data;

(c) retrieving—via the communication interface—using the at least one computer processor, coating tool parameter data based on the provided coating material data, said coating tool parameter data including coating tool tolerance data and at least one application parameter associated with the coating tool, coating procedure data including a rule set for coating outer edges and edges adjacent to at least one open space and a rule set for coating main surfaces, and substrate type data based on the provided spatial substrate data, said substrate type data including a rule set for the type of spatial substrate matching the substrate classification data;

(d) generating—with the at least one computer processor-tool path data for at least one tool path to be followed by the coating tool along the surface of the spatial substrate based on the data retrieved in step (c) and optionally the result of the determination performed in step (b), wherein generating tool path data for at least one tool path to be followed by the coating tool along the 15 surface of each spatial substrate includes:

generating, with the at least one computer processor, a 3D model of the spatial substrate based on the provided spatial substrate data and optionally applying a rule set to smooth the surface of the generated 3D model, determining, with the computer processor, the one or more outer edges, the one or more edges adjacent to open spaces, the main surfaces, and the one or more open spaces present within the spatial substrate based on the retrieved coating procedure parameter data, and the generated and optionally smoothed 3D model, generating, with the at least one computer processor, tool path data for outer edges and tool path data for edges adjacent to at least one open space based on the retrieved coating procedure data, the retrieved coating tool parameter data, the retrieved substrate type data, the determined outer edges, edges adjacent to open spaces and open spaces, and the generated and optionally smoothed 3D model, generating, with the at least one computer processor, tool path data for main surfaces of each spatial substrate based on the retrieved coating procedure data, the retrieved coating tool parameter data, the determined main surfaces, and the generated and optionally smoothed 3D model, and optionally repeating said steps for at least one further coating material based on the retrieved coating procedure data and the retrieved coating tool parameter data associated with the at least one further coating material;

(e) generating—with the at least one computer processor—the robot path data based on tool path data generated in step (d); and (f) providing the generated robot path data via the communication interface to the robot containing the coating tool for coating at least part of the surface of the spatial substrate with the coating material.

It is an essential advantage of the method according to the present invention that it allows to generate robot path data for spatial substrates having a high level of variation with respect to their geometry due to the use of the rule set for coating outer edges and edges adjacent to open space(s), the rule set for coating main surfaces and the rule set for each type of spatial substrate. The rule sets allow to apply different coating rules to identified features, such as outer edges, edges adjacent to open space(s) and open space(s), of the spatial substrate, and/or characteristics of the spatial substrate. This allows to coat spatial substrates, such as automotive parts, having a high level of geometric variation in the automotive refinish sector using robotic coating systems. The information on the color of the spatial substrate allows to automatically identify specific areas of the spatial substrate to either be excluded (for example masking materials) from the coating process, or to be included (for example areas already coated with a primer or primer-surfacer coating). Moreover, the color information allows to identify the boundaries of those colored areas such that specific rules can be applied to enable smooth coating transitions to increase the color and surface quality of the coated spatial substrate. The inventive method allows to generate robot path data for one of more spatial substrates in one step irrespective of the coating materials to be applied to said spatial substrates and the type of spatial substrate, thus rendering the inventive method very effective with respect to coating several spatial substrates with coating material(s) fully automatically. Due to the automatization of the coating material application, a constant high optical and mechanical quality is achieved where manual application causes variation due to the influence of the varying application parameters on the resulting overall quality.

Further disclosed is:

A computing apparatus for generating robot path data for robot path(s) to be followed by a robot comprising a coating tool during coating a spatial substrate with at least one coating material comprising:

at least one computer processor; and a memory storing instructions that, when executed by the processor, configure the apparatus to perform the steps of the inventive method.

Further disclosed is:

a robotic system for coating at least one surface of a spatial substrate with at least one coating material, said system comprising:

an inventive computing apparatus for generating robot path data for robot path(s) to be followed by a robot of the robot system during coating the at least one surface of at least one spatial substrate with at least one coating material, a robot apparatus configured to receive the generated robot path data and use the received robot path data to apply at least one coating material from a coating tool to the at least part of the surface of the at least one spatial substrate.

Further disclosed is:

a robotic system for coating at least one surface of a spatial substrate with at least one coating material, said system comprising:

a computing apparatus for generating robot path data for robot path(s) to be followed by a robot of the robot system during coating the at least one surface of the spatial substrate with at least one coating material, the computing apparatus comprising:

at least one computer processor, and a memory storing instructions that, when executed by the processor, configure the apparatus to perform the methods as disclosed herein, a robot apparatus configured to receive the generated robot path data and use the received robot path data to apply at least one coating material from a coating tool to the at least part of the surface of the spatial substrate.

It is an essential advantage of the robotic system according to the present invention that spatial substrates having a high level of variation with respect to their geometry can be coated with at least one coating material fully automatically without requiring any user interaction during generating of the robot path data. By using rule sets during generation of the robot path data, such robot path data may be reliably generated for substrates having a high level of geometric variation, hence allowing to coat such substrates by the robotic system using the generated robot path data such that coatings having a high optical and mechanical quality are obtained irrespective of the geometry of the respective substrate. If the robot system further comprises a scanning device, data on the color and geometry of the spatial substrate can be determined by the robot apparatus, thus reducing the amount of separate devices necessary to determine the geometry and color of the spatial substrate needed by the computing apparatus of the invention to determine the robot path data. Moreover, the presence of a scanning device allows to acquired data on the color and geometry of the spatial substrate to be coated prior to the coating process, thus allowing to coat spatial substrates for which no data on their color and geometry is available prior to performing the coating process. The information on the color of the spatial substrate can be used to automatically identify specific areas of the spatial substrate to either be excluded (for example masking materials) from the coating process, or to be included (for example areas already coated with a primer or primer-surfacer coating). Moreover, the color information can be used to identify the boundaries of those colored areas such that specific rules can be applied to enable smooth coating transitions to increase the color and surface quality of the coated spatial substrate. The inventive robotic system allows to apply at least one coating material to one or more spatial substrates, irrespective of the coating materials to be applied to said spatial substrates and the type of spatial substrate, thus rendering the robotic system very effective with respect to coating several spatial substrates with coating material(s) fully automatically.

Further disclosed is:

Use of the inventive method or the inventive computing apparatus for coating at least part of the surface of at least one spatial substrate with at least one coating material using a robot containing a coating tool.

Further disclosed is:

A non-transitory computer-readable storage medium, the computer-readable storage medium including instructions that when executed by a computer, cause the computer to perform the steps according to the inventive method.

Any disclosure and embodiments described herein relate to methods, systems, apparatuses and computer elements disclosed herein and vice versa. Benefits provided by any of the embodiments and examples provided herein equally apply to all other embodiments and examples and vice versa.

EMBODIMENTS

Embodiments of the Inventive Methods

The inventive methods allow to generate robot path data for robot path(s) to be followed by a robot comprising a coating tool, such as a spray application tool, during coating at least part of the surface of the at least one spatial substrate with the at least one coating material. The generated robot path data may be used by a robotic system comprising a robot containing a coating tool to coat at least part of the surface of a substrate. In one example, the robot path data is generated for one spatial substrate. In another example, the robot path data is generated for at least two spatial substrates, such as 2 to or 2 to 10 spatial substrates. The term "robot path" as used herein denotes the movement path of the robot, such as an industrial robot, relative to the surface of the spatial substrate, in particular relative to the surface of the spatial substrate to be coated with a coating material applied from the coating tool attached to the robot. The term "coating material" as used herein refers to a chemical composition in liquid, paste or powder form which, when applied to the surface of the spatial substrate, produces a coating with protective, decorative and/or other specific properties (see DIN EN 971-1:1996-09). The produced coating may comprise one coating layer or may comprise a plurality of coating layers (also called multicoat paint system). The coating layer(s) of the coating can be produced using different or similar coating materials. For example, the coating may comprise two basecoat layers, which may have been prepared by applying two different basecoat materials or by applying the same basecoat material twice.

The robot can be any multi-axis industrial robot suitable for applying at least one coating material onto the surface of a spatial substrate. The robot may comprise a movable robot member, such as a robot arm, and the coating tool may be attached to the movable robot member. The robot can be controlled using a robot controller as described later on.

The spatial substrate can have any shape. In an aspect, the spatial substrate is a vehicle part. The term "vehicle part" is to be understood broadly in the present case and relates to part of an automobile such as a car, a van, a minivan, a bus, a SUV (sports utility vehicle); a truck; a semitruck; a tractor; a motorcycle; a trailer; an ATV (all-terrain vehicle); a pickup truck; a heavy duty mover, such as bulldozer, mobile crane and earth mover; an airplane; a boat; a ship; and other modes of transport. With particular preference, the term "automotive part" refers to part of an automobile; a truck; a semitruck; a tractor; a motorcycle; a trailer; an ATV (all-terrain vehicle); a pickup truck or a heavy duty mover. With preference, the automotive part is a car body part, in particular a hood, a fender, a door, a bumper, a quarter panel, a trunk or a hatch.

The spatial substrate may be an uncoated spatial substrate, i.e. a spatial substrate not comprising any coating layer, or an at least partially coated spatial substrate, i.e. a spatial substrate where at least part of the surface of said substrate already comprises at least one coating layer, such as a dried or cured coating layer. Suitable spatial substrates include (i) uncoated or at least partially coated spatial metal substrates; (ii) uncoated or at least partially coated spatial plastic substrates; and (iii) uncoated or at least partially coated spatial substrates comprising metallic and plastic parts. Suitable metal substrates are selected from the group comprising or consisting of steel, iron, aluminum, copper, zinc and magnesium substrates as well as substrates made of alloys of steel, iron, aluminum, copper, zinc and magnesium. The metal substrates can be pretreated in a manner known per se, i.e., for example, cleaned and/or provided with known conversion coatings. Cleaning can be performed mechanically, for example by means of wiping, grinding and/or polishing, and/or chemically by means of etching methods, such as surface etching in acid or alkali baths using, for example, hydrochloric acid or sulfuric acid, or by cleaning with organic solvents or aqueous detergents. Pretreatment can be performed by application of conversion coatings, especially by means of phosphation and/or chromation, preferably phosphation. Preferably, the spatial metallic substrates are at least conversion-coated, especially phosphated, preferably by a zinc phosphation. Preferred spatial plastic substrates are substrates comprising or consisting of (i) polar plastics, such as polycarbonate, polyamide, polystyrene, styrene copolymers, polyesters, polyphenylene oxides and blends of these plastics, (ii) synthetic resins such as polyurethane RIM, SMC, BMC and (iii) polyolefin substrates of the polyethylene and polypropylene type with a high rubber content, such as PP-EPDM, and surface-activated polyolefin substrates. The spatial plastic substrates may furthermore be fiber-reinforced, in particular using carbon fibers and/or metal fibers.

The coating material(s) used to coat at least part of the surface of the spatial substrate can be any suitable liquid or solid coating material(s), such as primer-surfacer coating material(s), primer coating material(s), basecoat material(s), clearcoat material(s), topcoat material(s) or single stage material(s). "Primer-surfacer coating material" (also denoted as filler coating material) refers to a coating material used to prepare an intermediate layer designed to fill out the irregularities of the surface of the spatial substrate, to support corrosion resistance and adhesion as well as to provide protection from mechanical exposure such as stone chipping. "Primer coating material" refers a coating material used to prepare the first coating layer of a multilayer coating on the surface of the spatial substrate. Primer coating materials are used to provide improved adhesion for the multilayer coating. Moreover, the primer coating materials result in coating layer which can provide improved corrosion protection, for example on metallic spatial substrates. “Basecoat material” refers to a color-imparting intermediate coating material commonly used in automotive painting. The basecoat material can be formulated as an effect coating material or as a solid color coating material. Effect coating materials generally contain at least one effect pigment and optionally other colored pigments or spheres which give the desired color and effect, while solid coating materials only comprise coloring pigments and are free of any effect pigments. “Clearcoat material” refers to a transparent coating material. “Transparent” means that a film formed from the coating material is not fully opaque but instead has a certain degree of transparency that allows the color of the underlying coating layer(s) to be visible through the clearcoat layer formed from the clearcoat material. The clearcoat material may therefore be completely free of pigments, comprise only transparent pigments or comprise amounts of pigments which do not render the coating layer resulting from the clearcoat material opaque. Typically, the clearcoat material is applied on top of the basecoat layer formed form the basecoat material(s) to protect the underlying basecoat layer. The term “topcoat material” refers to coating materials which are applied as last coating material in the coating process such that the coating layer formed from said material is the topmost coating layer of the coating. Topcoat materials can be colored coating materials, i.e. coating materials comprising effect and/or color pigments or can be clearcoat materials. The term “single stage material” refers to colored or transparent coating materials which are applied in a single layer on the spatial substrate, i.e. they do not require application of a further coating material on top of said layer. The robot path data may be generated for one coating material or for a plurality of coating materials, depending on whether the resulting coating should be a single layer coating or a multilayer coating and depending on the coating layer(s) already present on the spatial substrate.

In an aspect, the robot is located within a spray booth and each spatial substrate is located within the workspace of the robot. The term “workspace of the robot” is to be understood broadly in the present case and relates to the set of all positions that the robot, in particular a movable robot member, can reach. The workspace of the robot generally depends on a number of factors including the dimensions of the movable robot member, such as the robot arm. With particular preference, the robot is mounted to a rail system, such as a gudel rail system installed at the sides and/or the ceiling of the spray booth, to increase the workspace of the robot and to allow movement of the robot along the spatial substrate(s) to allow coating of spatial substrate(s) having larger dimensions. In one example, the workspace of the robot corresponds to the dimensions of the spray booth. In another example, the workspace of the robot is smaller than the dimensions of the spray booth. The spray booth may comprise markings to indicate different zones. This may allow the user to position the spatial substrate(s) within a respective zone or within a respective region of zones within the spray booth In an aspect, the coating tool includes a coating material applicator, in particular a spray applicator. In this example, the coating tool further comprises a coating material reservoir configured to contain a specific coting material, said reservoir being attached to the coating material applicator. In this example, the coating material reservoir is directly attached to the material applicator. Direct attachment means that the reservoir is directly connected to the material applicator, for example by using an appropriate connection. This avoids the use of additional tubes present in the spray booth which needs to be considered during generation of the robot path data. In another example, the reservoir is attached to the material applicator via a tube. In this example, the reservoir may be located within or outside of the spray booth and is connected to the material applicator via the tube. The coating tool may be permanently or temporary attached to the robot. In case the coating tool is temporarily attached to the robot, a plurality of different coating tools, such as coating tools comprising coating material reservoirs containing different coating materials, may be stored in a tool rack as described later on. Prior to performing the coating, the robot may be instructed by the robot controller to select the appropriate coating tool from the tool rack as described later on.

Step (a):

In step (a) of the inventive method, spatial substrate data as well as coating material data is provided via a communication interface to at least one computer processor. The spatial substrate data includes substrate classification data and data being indicative of the geometry and the color of each spatial substrate, in particular the surface of each spatial substrate. In case more than one spatial substrate is to be coated with at least one coating material, spatial substrate data for each spatial substrate to be coated is provided in step (a). The coating material data includes data being indicative of the type of the at least one coating material. In one example, the coating material data further includes the order of the coating materials to be applied to the spatial substrate. This is preferred if more than one coating material is applied to the spatial substrate to ensure that the coating materials are applied in the correct order. In another example, the coating material data does not include the order of the coating materials to be applied to the spatial substrate. This may be preferred if only one coating material is to be applied to the spatial substrate(s) or if a predefined order of coating materials is used during generation of the tool path data.

The term “communication interface” is to be understood broadly in the present case and relates to a software and/or hardware interface for establishing communication such as transfer or exchange or signals or data. Software interfaces may be e. g. function calls, APIs. Communication interfaces may comprise transceivers and/or receivers. The communication may either be wired, or it may be wireless. Communication interface may be based on or it supports one or more communication protocols. The communication protocol may a wireless protocol, for example: short distance communication protocol such as Bluetooth®, or WiFi, or long distance communication protocol such as cellular or mobile network, for example, second-generation cellular network (“2G”), 3G, 4G, Long-Term Evolution (“LTE”), or 5G. Alternatively, or in addition, the communication interface may even be based on a proprietary short distance or long distance protocol. The communication interface may support any one or more standards and/or proprietary protocols.

The term “computer processor” (also denoted as “hardware processor” in the following) is to be understood broadly in the present case and relates to an arbitrary logic circuitry configured to perform basic operations of a computer or system, and/or, generally, to a device which is configured for performing calculations or logic operations. In particular, the computer processor may be configured for processing basic instructions that drive the computer or system. As an example, the computer processor may comprise at least one arithmetic logic unit ("ALU"), at least one floating-point unit ("FPU)", such as a math coprocessor or a numeric coprocessor, a plurality of registers, specifically registers configured for supplying operands to the ALU and storing results of operations, and a memory, such as an L1 and L2 cache memory. In particular, computer processor may be a multicore processor. Specifically, the computer processor may be or may comprise a Central Processing Unit ("CPU"). The computer processor may be a ("GPU") graphics processing unit, ("TPU") tensor processing unit, ("CISC") Complex Instruction Set Computing microprocessor, Reduced Instruction Set Computing ("RISC") microprocessor, Very Long Instruction Word ("VLIW") microprocessor, or a processor implementing other instruction sets or processors implementing a combination of instruction sets. The computer processor may also be one or more special-purpose processing devices such as an Application-Specific Integrated Circuit ("ASIC"), a Field Programmable Gate Array ("FPGA"), a Complex Programmable Logic Device ("CPLD"), a Digital Signal Processor ("DSP"), a network processor, or the like. The inventive method may be implemented as software in a DSP, in a micro-controller, or in any other side-processor or as hardware circuit within an ASIC, CPLD, or FPGA. It is to be understood that the term computer processor may also refer to one or more processing devices, such as a distributed system of processing devices located across multiple computer systems (e.g., cloud computing), and is not limited to a single device unless otherwise specified.

Spatial Substrate Data:

In an aspect, the data being indicative of the geometry and color of each spatial substrate includes data representing each spatial substrate in three-dimensional space, in particular a three-dimensional point cloud of each spatial substrate, and color data of each spatial substrate. The color data may include color space data or static image data. One example of color space data is defined by L*a*b*, where L* represents luminous intensity, a* represents a red/green appearance, and b* represents a yellow/blue appearance. Another example of color space data is defined by L*, C*, h, where L* represents lightness, C* represents chroma, and h represents hue. Yet another example of color space data is defined by RGB, where R represents the red channel, G represents the green channel, and B represents the blue channel. With particular preference, the color space data is defined by RGB. The static image data may refer to the frames acquired by the scanning device described later on.

Apart from the spatial substrate classification data and the data being indicative of the geometry and color of each spatial substrate, the spatial substrate data may further include a substrate ID, a substrate name, a bar code, a QR code, data on the substrate manufacturer, data on the substrate composition, substrate production data, a rule set to smooth the surface of a 3D model generated from data being indicative of the geometry and color of each spatial substrate, or a combination thereof. Associating the rule set to smooth the surface of the 3D model with a defined type of spatial substrate allows to apply different rule sets to different substrate types, thus allowing to define—for each substrate type—specific smoothing rules and to perform the smoothing depending on the substrate type.

The spatial substrate data may be provided in numerous ways. In one non-limiting example, providing the spatial substrate data includes

- detecting, with the at least one computer processor, a user input being indicative of a substrate classification associated with each spatial substrate and a user input being indicative of the location of each spatial substrate within the workspace of the robot,
- determining, with the at least one computer processor, based on the detected user input, substrate classification data for each spatial substrate and the location of each spatial substrate within the workspace of the robot,
- providing via a communication interface to the at least one computer processor data of the workspace of the robot,
- determining, with the at least one computer processor, collision geometries present within said workspace based on the provided data of the workspace of the robot,
- determining, with the at least one computer processor, scan path data for scan path(s) to be followed by a scanning device along the surface of each spatial substrate based on the determined location of each spatial substrate within the workspace of the robot and the determined collision geometries, and providing, via the communication interface, the determined scan path data to the scanning device,
- generating, with the at least one computer processor, the spatial substrate data for each spatial substrate by retrieving, via the communication interface, data being indicative of the geometry and color of each spatial substrate acquired by the scanning device based on the provided scan path data and combining the retrieved data at least with the determined substrate classification data for each spatial substrate.

The steps of detecting the user input and determining substrate classification data and the location of each spatial substate based on the detected user input can also be performed after any time prior to generating the spatial substrate data. For example, one or both steps may be performed after determining scan path data and prior to generating the spatial substrate data. Detecting the user input may include displaying a user interface which allows the user to select the substrate classification associated with each spatial substrate to be coated, for example by displaying a list of possible substrate classifications, such as trunk, hood, fender, etc., or by displaying a text field and prompting the user to enter the respective spatial substrate classification or substrate classification ID associated with each spatial substrate to be coated, and which allows the user to select the location of each spatial substrate to be coated within the workspace of the robot, for example by displaying a map or image of the spray booth and prompting the user to select the location of each spatial substrate to be coated in the displayed map of the spray booth. The graphical user interface may be displayed on the screen of a display device. In one example, the display device houses the at least one computer processor, for example if the display device is a tablet etc. In another example, the display device is attached to the at least one computer processor via a communication interface, for example if the display device is an external computer monitor, a laptop monitor, or if the display device merely serves to display the graphical user interface etc. The user input may be detected via an interaction element, such as an input device or input/output device, in particular a mouse, a keyboard, a trackball, a touch screen or a combination thereof. In another example, the interaction element may be the projection area in which a user input in the form of a gesture, such as a finger gesture or motion of the hand, is received.

In one example, the location of each spatial substrate in the workspace of the robot includes the location of each spatial substrate in at least one zone of a spray booth containing the robot. Thus, the spray booth is separated into at least two different zones and the user has to select the zone(s) of the spray booth in which each spatial substrate is located in. Selection of the at least one zone may be facilitated using a graphical user interface which displays a map or image of the spray booth separated into at least two different zones and prompting the user to select at least one zone, for example by clicking on the respective zone or number of zones or by entering number(s) assigned to the respective zone(s).

Data of the workspace of the robot may be provided by retrieving said data from a data storage medium, such as an internal memory or a database connected to the at least one computer processor via a communication interface or by performing a scan of the spray booth comprising the spatial substrate(s) to be coated. In one example, said data includes data representing the workspace in three-dimensional space, in particular a three-dimensional point cloud of the workspace, and color data of the workspace. The 3D point cloud of the workspace can, for example, be acquired by attaching a commonly known 3D scanning tool to the robot and scanning the workspace of the robot using said tool. Color data of the workspace is necessary to perform step (b) of the inventive process as well as to determine already present coating layers on the substrate which may require application of certain rues contained in the coating tool parameter data to obtain smooth transitions between the already present coating layers and the coating material(s) applied by the coating tool of the robot.

Generation of collision geometries from the provided data of the workspace of the robot can be performed according to methods well known in the state of the art and may include filtering the provided data to reduce the number of data points, determining whether the data contains geometries having a certain size, creating 3D object(s) present within the workspace from extreme data points and filling the generated object(s) with volume, or a combination thereof.

Since data on the workspace of the robot is only sufficient to determine the collision geometries, scan path data need to be determined to obtain detailed data on the geometry and the color of each spatial substrate present within the workspace of the robot to allow generation of the tool path data as described later on. In one example, the scan path data is determined for each zone of the spray booth from the location of each spatial substrate within the workspace of the robot and the determined collision geometries. In case the spatial substrate(s) is/are present in more than one zone of the spray booth, the zones may be gone through in defined order upon determining the scan path data. The scan path data preferably consists of a raster like series of data points in space, each series representing a full stroke line between the starting of the raster stroke and the end of the raster stroke along the surface of each spatial substrate to be scanned. The determined scan path data is provided via a communication interface to a scanning device (also called sensor device or sensor system hereinafter). In case the scanning device is attached to the robot, the determined scan path data is preferably provided to a robot controller connected via a communication interface with the robot, the robot controller being configured to control the robot using the received scan path data. In case the scanning device is present separate from the robot, the scan path data is provided to the scanning device, or a controller configured to control the scanning device. Attachment of the scanning device to the robot performing the coating material application and provision of the generated scan path data to the robot controller is preferred because it reduced the number of apparatuses and thus the complexity required to generate the spatial substrate data and to coat the spatial substrate fully automatically.

The generated spatial substrate data can be interrelated with a substrate ID and can be provided via a communication interface to a data storage medium for storage. This allows to retrieve the generated spatial substrate data using the substrate ID at a later point in time, for example during generation of tool path data or if the inventive method is performed for the same spatial substrate at a later point in time, thus avoiding generation of the spatial substrate data the next time said data is required. In case more than one spatial substrate is present within the workspace of the robot, the spatial substrate data generated for each spatial substrate is interrelated with the appropriate substrate ID. This may be performed, for example, by assigning a location ID to the scan path data acquired for each spatial substrate and correlating the location ID to the location of each spatial substrate determined based on the detected user input.

Coating Material Data:

The coating material data includes at least data being indicative of the identity of the coating material and may further include the order of the coating materials to be applied to each spatial substrate and/or data being indicative of the coating tool to be used to apply each coating material. Data being indicative of the identity of the coating material preferably includes the name of each coating material type, the ID of each coating material type, or a combination thereof. The name of the coating material type may include, for example, clearcoat, basecoat, sealer, primer, primer-surfacer, topcoat, single stage material etc. Each coating material type may have been assigned a unique ID such that it allows to identify each coating material type, such as clearcoat, basecoat, sealer, primer, primer-surfacer, topcoat, single stage material, by its uniquely assigned ID. Data being indicative of the coating tool may comprise a unique coating tool ID, a coating tool type, such as ESTA, pneumatic applicator, etc., or a combination thereof.

The coating material data can be provided, for example, by displaying a user interface and prompting the user to enter the data being indicative of the identity of the coating material(s), such as the type of the coating material(s), i.e. clearcoat, basecoat, sealer, primer, primer-surfacer, topcoat, single stage material. The identity of the coating material can also be provided by displaying, within a user interface, a list of existing coating material types and detecting a user input being indicative of selecting at least one list item. The user may also enter or provide the ID/bar code/QR code of each coating material and the data being indicative of the identity may then be retrieved by the processor from a data storage medium having stored thereon coating material IDs/bar codes/QR codes interrelated with their respective data being indicative of the identity of the type of the coating material.

In one example, the order of the coating materials to be applied needs to be entered by the user, for example by displaying a user interface and prompting the user to enter the order for the provided coating material identities. In another example, a predefined order is used for the provided data being indicative of the identity/identities of the coating material(s). The predefined order may, for example, be determined from a rule set containing rules to determine the order of coating materials to be applied based on the provided coating material types. For example, the rule set may comprise a rule which determines that coating material types “basecoat” and “clearcoat” entered by the user are applied in the following order: basecoat followed by clear-coat.

In one example, data being indicative of the coating tool must be entered by the user, for example by displaying a user interface and prompting the user to enter the data, such as by displaying a list and prompting the user to select a list item or by displaying a text field and prompting the user to enter the appropriate data. This may be preferred if a coating material can be applied with a plurality of coating tools because in this case, the data being indicative of the type of the at least one coating material cannot be used to retrieve application parameters associated with a specific coating tool since several coating tools can be used.

In an aspect, the coating material data further includes chemical property data of the coating material(s), physical property data of the coating material(s), data on the composition of each coating material, the ID of each coating material, the bar code of each coating material, the QR code of each coating material, data on the material manufacturer of each coating material, data being indicative of the spatial substrate to be coated with the coating material(s), or a combination thereof. Data being indicative of the spatial substrate to be coated may include the substrate ID or substrate type described earlier. This data is in general only necessary if more than one spatial substrate is to be coated and the coating material(s) used to coat the plurality of spatial substrates differ at least for part of the spatial substrate. In this case, the data being indicative of the spatial substrate to be coated with the coating material(s) has to be provided to ensure that the correct coating material(s) are applied to each spatial substrate.

Optional Step (b):

In step (b), the computer processor determines whether each spatial substrate, in particular part of the surface of each spatial substrate, comprises at least one masking material based on the data provided in step (a), this step being generally optional. Use of masking materials on part of the surface of the spatial substrate(s) allows to avoid coating of the masked areas and may be used, for example, if the spatial substrate(s) comprise(s) areas which should not be coated or if the spatial substrate(s) is/are to be coated with two differently colored coating materials with a clear visible separation between the applied coating materials. Performing this step allows to reduce consumption of the coating material and the overspray because areas covered with masking material are excluded during determination of the robot path data, thus avoiding application of coating material onto the masking material.

The term “masking material” is to be understood broadly in the present case and relates to materials which are applied onto part of the surface of the spatial substrate to protect said surface from the coating material that is applied onto the spatial substrate using the coating tool attached to the robot. Thus, the surface of the spatial substate covered by the masking material is not coated with the applied coating material. The masking material should have a sufficient degree of adhesion onto the surface of the spatial substrate to avoid removal of said masking material during the coating process. However, the masking material should be removable without leaving unwanted residues on the surface of the spatial substrate to avoid time consuming cleaning operations following the removal.

In an aspect, the masking material includes masking paper, masking tape, masking film or a combination thereof. For example, the masking paper may be fixed to part of the surface of the spatial substrate using masking tape or masking film.

Determining whether each spatial substrate comprises at least one masking material based on the provided spatial substrate data may include generating three-dimensional (3D) model(s) using the provided spatial substrate data and providing the generated 3D model(s) to a data-driven model parametrized on historical data of masking materials, in particular parametrized on historical 3D models of spatial substrates containing masking material(s). The 3D model(s) is/are preferably created using the 3D point cloud data and the color data contained in the provided spatial substrate data, i.e. each 3D model is a 3D color model. Generation of the 3D model(s) from the point cloud data and color data can be performed according to methods well known in the state of the art.

“Data driven model” may refer to a model at least partially derived from data. Use of a data driven model can allow describing relations, that cannot be modelled by physico-chemical laws. The use of data driven models can allow to describe relations without solving equations from physico-chemical laws. This can reduce computational power and can improve speed. The data driven model may be derived from Machine Learning (Machine Learning and Deep Learning frameworks and libraries for large-scale data mining: a survey, Artificial Intelligence Review, Vol. 52, 2019, pages 77 to 124). The data driven model may comprise empirical or so-called “black box models”. Empirical or “black box” model may refer to models being built by using one or more of machine learning, deep learning, neural networks, or other form of artificial intelligence. The empirical or “black box” model may be any model that yields a good fit between training and test data.

In one example, the data-driven model is a trained machine learning model which has been trained to determine masking materials present on the surface of spatial substrates based on historical color data of masking materials present on the surface of historical spatial substrates. The historical color data may comprise 3D color models of spatial substrates, each spatial substrate comprising at least one masking material. The trained machine learning module may be a classifier which classifies which surface areas of provided 3D color model contain masking material(s). “Machine Learning” may refer to computer algorithms that improve through experience and build on a model based on sample data, often described as training data, utilizing supervised, unsupervised, or semi-supervised machine learning techniques. Supervised learning includes using training data having a known label or result and preparing a model through a training process in which it is required to make predictions and is corrected when those predictions are wrong. The training process continues until the model achieves a desired level of accuracy on the training data. Semi-supervised learning includes using a mixture of labelled and unlabelled input data and preparing a model through a training process in which the model must learn the structures to organize the data as well as make predictions. Unsupervised learning includes using unlabelled input data not having a known result and preparing a model by deducing structures, such as general rules, similarity, etc., present in the input data. In one example, the machine learning algorithm is trained by selecting inputs and outputs to define an internal structure of the machine learning algorithm, applying a collection of input and output data samples to train the machine learning algorithm, verifying the accuracy of the machine learning algorithm by applying input data samples of comprising known masking material(s), comparing the produced output values with expected output values, and modifying the parameters of the machine learning algorithm using an optimizing algorithm in case the received output values are not corresponding to input data samples. As inputs, the previously described images of historical spatial substrates comprising masking material(s) or being free of masking material(s) may be used. The input data is selected randomly but with the proviso that the training data contains the complete spectra of masking materials. Output may be a 3D model of the spatial substrate indicating areas comprising masking materials or may be a classifier in case the spatial substrate does not comprising any masking material.

In principle, a suitable machine learning model or algorithm can be chosen by the person skilled in the art considering the pre-processing, the existence of a solution set, the distinction between regression and classification problems, the computational load, and other factors. The machine learning algorithms cheat sheet may be used for this purpose (see FIG. 6 in P. Sivasothy et al.: "Proof of concept: Machine learning based filling level estimation for bulk solid silos"; Proc. Mtgs. Acoust.; Vol. 35; 055002; 2018). Within the present invention, the machine learning algorithms may be (i) deep learning algorithms, such as Long Short-Term Memory (LSTM) algorithms, Gated Recurrent Unit (GRU) algorithms or perceptron algorithms, (ii) instance-based algorithms, such as support vector machines (SVMs), in particular deep learning algorithms. "Deep learning" may refer to methods based on artificial neural networks (ANNs) having an unbounded number of layers of bounded size, which permits practical application and optimized implementation, while retaining theoretical universality under mild conditions. Deep learning architectures implementing deep learning algorithms may include deep neural networks, deep belief networks (DBNs), recurrent neural networks (RNNs) and convolutional neural networks (CNNs). Suitable optimization algorithms to manipulate the parameters of the learning algorithm(s) during training are known in the state of the art and include, for example, gradient descent, momentum, rmsprop, newton-based optimizers, adam, BFGS or model specific methods. These optimizing algorithms are used during training of the machine learning algorithm to modify the parameters in each training step such that the difference between the output of the machine learning algorithm and the expected output is decreased until a predefined termination criterium, such as number of iterations or accuracy, is obtained.

The determination of the trained machine learning model concerning the presence of masking material may be provided to a display device for display on the screen. For example, 3D color model(s) comprising a classification of which surface areas of each spatial substrate contain masking material(s) may be provided to the display device for display on the screen, for example within a graphical user interface. This allows a user to check whether the presence and location of masking material(s) was correctly detected by the trained machine learning model and allows to correct the presence and location if the masking material(s) present on spatial substrate(s) were not correctly determined. The result of the determination as well as the data associated with the user's approval or correction(s) may be provided via a communication interface to the computing device used to train the machine learning model as training data set. This allows to improve the performance of the trained machine learning model using data acquired during the inventive method.

Step (c):

In step (c) of the inventive method, various data is retrieved via the communication interface using the at least one computer processor, namely coating tool parameter data, coating procedure data and substrate type data. Said data may be stored on a data storage medium, such as an internal memory or a database connected via a communication interface with the at least one computer processor, and may be retrieved, for example, using the substrate classification data and coating material ID contained in the provided spatial substrate data and coating material data. "Data storage medium" may refer to physical and other computer-readable media for carrying or storing computer-executable instructions and/or data structures. Such computer-readable media can be any available media that can be accessed by a general-purpose or special-purpose computer system. Computer-readable media may include physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention. "Database" may refer to a collection of related information that can be searched and retrieved. The database can be a searchable electronic numerical, alphanumerical, or textual document; a searchable PDF document; a Microsoft Excel® spreadsheet; or a Database commonly known in the state of the art. The database can be a set of electronic documents, photographs, images, diagrams, data, or drawings, residing in a computer readable storage media that can be searched and retrieved. A database can be a single Database or a set of related databases or a group of unrelated databases. "Related Database" means that there is at least one common information element in the related databases that can be used to relate such databases.

Coating Tool Parameter Data:

The coating tool parameter data includes coating tool tolerance data and at least one application parameter associated with the coating tool. The term "application parameter associated with the coating tool" refers to parameters which are used to apply a specific liquid or solid coating material using a defined coating tool. For example, if the coating tool is a spray applicator and the coating material is a liquid basecoat material, said parameters refer to spray parameters necessary to apply the specific liquid basecoat material coating material to the surface of the spatial substrate using said spray applicator.

In an aspect, the coating tool tolerance data includes target distance data, overlap percentage data, pattern size data, rotational tolerance(s) about the z-axis of the coating tool, rotational tolerance(s) about the x-axis of the coating tool, rotational tolerance(s) about the y-axis of the coating tool, or a combination thereof. Target distance data and overlap percentage may refer to a defined target distance value/overlap percentage and/or a target distance range/overlap percentage range. Combination of a defined value and a range allows to use the defined value as a starting point for generation of tool path data and to adapt said starting point with the provided range if it is required to generate tool path data having the required quality. The term "target distance" refers to the distance from end of the coating tool, such as the nozzle of the coating material applicator, to surface of the spatial substrate and may range from 6 inch to 12 inch. The pattern size may be fixed for a certain target distance and may scale with the target distance. For example, a defined pattern size may be associated with a target distance of 6 inch and a target distance of 12 inch and linear interpolation may be used to determine the pattern size for target distances within said range. The pattern size data may thus comprise rules that correlate a given target distance with a certain pattern size or pattern size range.

In an aspect, the at least one application parameter associated with the coating tool includes the flow rate of the coating material, the voltage applied to the coating material, the pressure applied to the coating material, the bell speed of the coating tool, or a combination thereof. The application parameters contained in the coating tool parameter data are dependent on the type of the coating tool, such that different coating tools result in different application parameters being contained in the coating tool parameter data. For example, an electrostatic spray applicator requires a voltage parameter while such a parameter is not necessary for a pneumatic spray applicator.

The coating tool parameter data is retrieved using the at least one computer processor based on the provided coating material data. Retrieving coating tool parameter data based on the provided coating material data may include retrieving data being indicative of the type of the at least one coating material contained in the provided coating material data and optionally data being indicative of the coating tool and retrieving the coating tool parameter data associated with the retrieved data being indicative of the type of the at least one coating material and optionally the retrieved data being indicative of the coating tool. The coating tool parameter data may be stored on a data storage medium and may be interrelated with the data being indicative of the type of the coating material, such as the unique ID mentioned previously. The unique ID may be used to retrieve the appropriate coating tool parameter data from the data storage medium, such as an internal memory or database connected to the at least one computer processor via the communication interface.

Coating Procedure Data:

The retrieved coating procedure data includes a rule set for coating outer edges and edges adjacent to open space(s) and a rule set for coating main surfaces. The term "rule set" refers to unit of execution of rules and/or decision tables and/or algorithms, i.e. the rule set organizes rules and/or decision tables and/or algorithms into a unit of execution. Multiple rulesets can be executed in a defined order (also called rule flow). In rulesets, rule priorities may be used to specify the order in which the rules contained in a rule set should be executed. Each rule set comprises one or more rules. Each rule contains a condition and an action associated with the condition, i.e. an action that is performed if the condition is determined to be fulfilled or true.

Each rule set may comprise one or more rules or algorithms. For example, the rule set for coating outer edges of the spatial substrate and edges adjacent to open space(s) may comprise at least one algorithm for determining outer edges and at least one algorithm for determining edges adjacent to open space(s) present within the surface spatial substrate. The algorithm for determining edges adjacent to open space(s) may also allow to determine open space(s) present with the spatial substrate which are at least partly surrounded by the determined edges adjacent to open space(s). "Edges adjacent to open space(s)" refers to edges, which are present adjacent to open space(s) within the surface of the spatial substrate. Such open spaces may, for example, be represented by marker light pockets, window frames, head light pockets, etc. "Open space(s)" refers to holes present inside the spatial substrate, such as marker light pockets in fenders, windows in doors and hood scoop pockets in hoods, as well as indentations present within the spatial substrate, such as front light pockets of a fender, top inner rail and tab of a fender or the lower flange on the dog-leg of a fender.

In an aspect, the rule set for coating outer edges and edges adjacent to open space(s) includes rules for coating edges adjacent to open space(s), rules for coating outer edges and optionally rules of coating open space(s) present within the spatial substrate which are at least partly surrounded by edges adjacent to open space(s). At least the rules for coating edges adjacent to open space(s) and the rules of coating open space(s) present within the spatial substrate may include coating tool tolerance data being different from the coating tool tolerance data contained in the retrieved coating tool parameter data. In one example, also the rules for coating outer edges may include coating tool tolerance data being different from the coating tool tolerance data contained in the retrieved coating tool parameter data. This may, for example, be the case for spatial substrates comprising grills, such as an automotive bumper cover. Thus, the target distance data, overlap percentage data, pattern size data and rotational tolerance(s) contained in said rules are different than the target distance data, overlap percentage data, pattern size data and rotational tolerance(s) included in coating tool parameter data. This allows to modify the retrieved coating tool tolerance data in case edges adjacent to open space(s) and thus also open space(s) are detected and thus allows to use different target distances and/or overlap percentages and/or pattern sizes and/or rotational tolerance(s) for coating open spaces and their edges. For example, an angular variation of up to 45° from the parallel to the surface plane in the x-axis (i.e. in pitch) may be allowed for the coating tool to coat open space(s) and/or edges adjacent to open space(s).

In an aspect, the rule set for coating main surfaces includes rules for determining the start of the coating procedure, rules for coating direction, rules for rotation of the coating tool within a tool path, rules for separation of surfaces, or a combination thereof. "Main surfaces" refers to the surface present between the outer edges of the spatial substrate excluding open spaces in said surface. Thus, the main surface may either not comprise any open spaces or may comprise open spaces. However, the open spaces present within the main surfaces are not counted to the main surfaces.

By using rule sets during generation of the robot path data, such robot path data may be reliably generated for substrates having a high level of geometric variation This allows to coat such substrates by the robotic system using the generated robot path data such that coatings having a high optical and mechanical quality are obtained irrespective of the geometry of the respective substrate. Hence, the robot path data can be tailored to the respective substrate using such rule sets without requiring manual interaction to ensure that the geometry of the substrate is sufficiently considered during generation of the robot path data to avoid improper coating material application which may result in reduced optical and/or mechanical quality of the resulting coating.

If at least two different coating materials are applied, the aforementioned coating tool parameter data and coating procedure data is retrieved for each coating material and the tool path data is generated for each coating material using the retrieved coating tool parameter data, coating procedure data and retrieved spatial substrate data as described below.

Substate Type Data:

The substate type data is retrieved based on the provided spatial substrate data, in particular based on the substrate classification data contained in said provided spatial substrate data. The retrieved substrate type data includes at least one rule set for the type of spatial substrate matching the substrate classification data contained in the provided spatial substrate data. The term "type of spatial substrate matching the substrate classification data" refers to a type of spatial substrate being identical to the substrate classification data mentioned previously or being the type of spatial substrate associated with a unique classification ID. For example, if the substrate classification data equals "fender", the type of spatial substrate is also "fender". Likewise, if the substrate classification data equals a unique classification ID, the type of spatial substrate corresponds to the type associated with said unique ID. In case different types of spatial substrate are to be coated, the substrate type data is retrieved for each spatial substrate classification data contained in the spatial substrate data provided for each spatial substrate in step (a).

In an aspect, the at least one rule set includes at least one rule to coat edges adjacent to open space(s) for the respective type of spatial substrate, data on the required quality of the tool path(s), optionally at least one rule to coat open space(s) present within the spatial substrate and optionally at least one rotational tolerance of the coating tool. The rotational tolerance(s) of the coating tool may include the previously mentioned rotational tolerances about the x-axis, the y-axis and z-axis of the coating tool.

Retrieving the substrate type data may include determining the substrate classification data contained in the provided spatial substrate data and retrieving the substrate type data associated with the determined substrate classification data from a data storage medium. For this purpose, the substrate type data may be interrelated with substrate classification data prior to storing said data on a data storage medium, such as an internal memory or a database connected via a communication interface to the at least one computer processor.

Step (d):

In step (d) of the inventive method, tool path data for tool path(s) to be followed by the coating tool along the surface of each spatial substrate are generated with the at least one computer processor based on the data retrieved in step (c) and optionally the result of the determination performed in step (b). "Tool path" refers to the movement path of the coating tool, in particular a coating material applicator, such as a spray applicator, relative to the surface of each spatial substrate, in particular relative to the surface of each spatial substrate to be coated with a coating material applied from the coating tool, such as the coating material applicator. The tool path thus comprises a trajectory of three dimensional positions of the distal end and orientation angle of the operational axis that follows the topographical profile of each spatial substrate offset therefrom to avoid collision of the coating tool with each spatial substrate.

In an aspect, generating tool path data for tool path(s) to be followed by the coating tool along the surface of each spatial substrate includes

- generating, with the at least one computer processor, a 3D model of each spatial substrate based on the provided spatial substrate data and optionally applying a rule set to smooth the surface of each generated 3D model,
- determining, with the computer processor, the outer edge (s), the edge(s) adjacent to open spaces, the main surfaces, and the open space(s) present within each spatial substrate based on the retrieved coating procedure data and the generated and optionally smoothed 3D model(s),
- generating, with the at least one computer processor, tool path data for outer edges and tool path data for edges adjacent to open space(s) based on the retrieved coating procedure data, the retrieved coating tool parameter data, the retrieved substrate type data, the determined outer edge(s), edge(s) adjacent to open spaces and open space(s), and the generated and optionally smoothed 3D model(s),
- generating, with the at least one computer processor, tool path data for main surfaces of each spatial substrate based on the retrieved coating procedure data, the retrieved coating tool parameter data, the determined main surfaces, and the generated and optionally smoothed 3D model(s), and
- optionally repeating said steps for at least one further coating material based on the retrieved coating procedure data and the retrieved coating tool parameter data associated with the at least one further coating material.

In one example, the 3D (3-dimensional) model of each spatial substrate is generated with the at least one computer processor using the 3D point cloud data contained in the spatial substate data provided in step (a). Each 3D model can be generated from the point cloud data using commonly available computer software, such as the open-source library Open3D. Each generated model may be smoothed using at least one rule set. The rule set may comprise rules allowing to determine the surfaces of each 3D model which can be smoothed, and the degree of smoothing associated with said surfaces. With preference, the degree of smoothing is chosen such that information necessary to generate toolpath data is not lost after the smoothing operation. Since the degree of smoothing of the surface allows to control the quality of the resulting coating, i.e. a higher degree of smoothing of a surface will result in a lower overall quality in terms of optical appearance of said coated surface, the degree of smoothing of the surface allows to control the overall optical appearance of the resulting surface. For surfaces which do not require a high quality in terms of optical appearance, such as front light pockets present within the fender, a higher degree of smoothing may be used on the generated 3D model than surfaces requiring a high quality in terms of optical appearance, such as the part of the fender visible after mounting the coated fender to the car body. Smoothing each 3D model allows to generate the tool path data for each spatial substrate and coating material to be applied onto said spatial substrate(s) more efficiently, because the meshes of each 3D model obtained from the respective point cloud data are converted into surfaces, which can be processed more efficiently during generation of the tool path data, for example by the computer processor(s) generating the tool path data as described later on.

Generating tool path data for outer edges and tool path data for edges adjacent to open space(s) based on the retrieved coating procedure data the retrieved substrate type data and the generated and optionally smoothed 3D model with the at least one computer processor may include

- determining the target distance(s), overlap percentage(s), pattern size and rotational tolerance(s) of the coating tool based on the determined outer edges, the determined edges adjacent to open space(s), the determined open space(s), the retrieved coating tool parameter data, the retrieved coating procedure data, the retrieved spatial substrate data, and the generated and optionally smoothed 3D model, and generate tool path data from the determined the target distance(s), overlap percentage(s), pattern size and rotational tolerance(s) of the coating tool using the generated and optionally smoothed 3D model.

Generating tool path data for main surfaces based on the retrieved coating procedure data, in particular the rule set for coating main surfaces, the retrieved coating tool parameter data and the generated and optionally smoothed 3D model with the at least one computer processor may include determining whether main surfaces of each spatial substrate comprise at least two separate surfaces based on the retrieved coating procedure data and the generated and optionally smoothed 3D model(s), determining whether main surfaces of each spatial substrate comprise a convex shape and creating an outer hull around said spatial substrate(s) using a convex hull method, determining the target distance(s), overlap percentage(s), pattern size and rotational tolerance(s) of the coating tool based on the determined separate surfaces, the determined convex shape, the retrieved coating tool parameter data, the retrieved coating procedure data, and the generated and optionally smoothed 3D model (s), and generate tool path data from the determined the target distance(s), overlap percentage(s), pattern size, rotational tolerance(s) of the coating tool using the generated and optionally smoothed 3D model(s).

In this example, the presence of separate surfaces is determined by determining whether each spatial substrate includes surfaces have a certain relative angularity between the resulting two faces and radius of curvature. For example, separation of surfaces is given if the determined relative angularity is from 25 to 90° and the radius of curvature is from 1 to 10 inches. Ensuring that both ranges for relative angularity and radius of curvature are fulfilled ensures that small body lines with a small radius of curvature but little difference in angularity between the two resulting faces are determined to be separate surfaces, thus avoiding unnecessary separation of surfaces of the spatial substrate.

The outer hull around convex surfaces of the spatial substrate(s), such as the convex surfaces of a bumper cover, can be determined, for example, using commonly known convex hull algorithms which are able to calculate a convex hull for a 3D spatial substrate. The outer hull can then be used to generate tool path data for said surface.

In one example, generating tool path data for tool path(s) to be followed by the coating tool along the surface of each spatial substrate further includes calculating the respective coating material application using the generated tool path data and determining whether the coating resulting from the calculated coating material application fulfils at least one predefined parameter. In case the coating does not fulfill at least one predefined parameter, the at least one computer processor may use the result of the determination to optimize the generated tool path data. This allows to ensure that the coating resulting from applying a coating material using the robot path data generated from said tool path data fulfills predefined quality parameters, such as wet and/or dry film thickness and surface area to be coated.

Predefined parameters may include, for example, the wet and/or dry film thickness or range thereof and/or the surface area to be coated or a range thereof.

Calculation of the coating material application using the generated tool path data may include simulation of the coating material application using the generated tool path data and a specific applicator used for the respective coating layer, for example by using a shader which simulates coating coverage by projecting light onto the surface of the 3D model. This simulation allows to calculate a coverage map of the generated and optionally smoothed 3D model using predefined parameters for how much material is deposited by said simulation. The coverage map can be used to determine whether a certain target area of the 3D model of each spatial substrate will be coated with the appropriate percentage of the coating material such that the wet and/or dry film thickness of the resulting coating layer fulfills a predefined range. The coverage map can also be used to control the thickness of transparent coating materials or the thickness of coatings on parts of the spatial substrate(s) that require certain specifications with respect to transmissibility, like ADAS (advanced driver assistant system) and radar sensors. The calculated coverage map may be provided via a communication interface, for example to a display device, for display on said device. The coverage map as well as further calculated data may be displayed within a graphical user interface (GUI). The coverage map may comprise different colors to indicate whether the predefined parameter(s) are fulfilled or not.

Step (e):

In step (e) of the inventive method, the at least one computer processor generates robot path data based on the tool path data generated in step (d).

Generating the robot path(s) may include determining collision geometries within the workspace of the robot based on the spatial substrate data and determining robot path data based on the determined collision geometries and the generated tool path data. Determination of the collision geometries ensures that the robot does not hit and destroy each spatial substrate during the coating procedure. The robot path data is generated such that the robot does not collide with each spatial substrate present within its workspace and can follow—with the coating tool—the generated tool path data. This may include determination of an initial pose of the robot, determination of all subsequent robot movements to follow the generated tool path data as well as determination of returning to the initial pose.

In an aspect, generating robot path data further includes sorting, with the at least one computer processor and prior to generating robot path data, the generated tool path data such that the robot path(s) generated from the tool path data for outer edges and edges adjacent to open space(s) are performed prior to or after the robot path(s) generated from the tool path data for main surfaces and/or optimizing, with the at least one computer processor, the generated or sorted robot path data.

Performing robot path(s) for outer edges and edges adjacent to open space(s) prior to robot path(s) for main surfaces may be beneficial because coating of the edges generates overspray on the main surfaces which can be covered by coating the main surfaces afterwards such that a negative influence on the final overall appearance is avoided. Moreover, this avoids application of too much coating material on the edges, which is unfavorable because too much coating material present on the edges is prone to sagging, runs and heavy edges, creating a negative influence on the final overall appearance of the coated substrate. However, it is likewise possible to perform the robot path(s) for the main surfaces first and then perform the robot path(s) for the edges. In this case, the application parameters have to be adapted such that the overspray generated from coating the edges is hidden and does not negatively influence the resulting overall appearance.

Optimization of the generated or sorted robot path data may be beneficial because it allows to smoothen the motion of the robot to make it more efficient and consistent. Optimization of the generated or sorted robot path data can be performed based on open-source libraries, such as Descartes (ROS-Industrial project for performing path-planning on under-defined Cartesian trajectories), and software frameworks, such as trajopt (software framework for generating robot trajectories by local optimization).

Step (f):

In step (f) of the inventive method, the generated robot path data is provided via the communication interface. In case the robot path data is sorted and/or optimized, the sorted or optimized robot path data is provided via the communication interface.

In one example, this includes providing the generated robot path data to a robot controller connected via a communication interface with the robot comprising the coating tool as described later on.

In another example, this includes providing the generated robot path data to a display device for display on said device. This may include a simulation of the robot path data to visualize the robot movements such that the user can ensure that the determined robot path data will not result in obvious destruction of the spatial substrate or the robot during the coating process. The user may have to approve the generated robot path data prior to providing said data to the robot controller.

In yet another example, the generated robot path data is provided via the communication interface to a data storage medium. For this purpose, the generated robot path data may be interrelated with a spatial substrate ID to allow retrieval of the generated robot path data if the same spatial substrate is to be coated again, thus reducing the amount of time necessary to generate the required robot path data.

Further Steps:

The inventive method may, apart from steps (a) to (f), comprise further steps. In one aspect, the inventive methods further include a step of determining—with the at least one computer processor—the amount of each coating material necessary to coat each spatial substrate based on the generated tool path data and the provided coating material data. The amount of each coating material may be calculated from the flowrates contained in the retrieved coating tool parameter data and from the generated tool path data, in particular the data being indicative of the application duration, i.e. the data associated with the duration the coating tool is switched on during the coating process of each spatial substrate. This further step may be performed prior to step (e), prior to step (f) or may be performed after step (f). The determined amount of each coating material may be provided, via the communication interface, to a display device for display, for example within a GUI, and/or to a mixing machine allowing to automatically prepare the respective amount of coating material. Performing this further step allows the user to obtain information on the amount of coating material that is going to be needed for the coating process and thus allows to use this data for inventory planning or to determine the amount of coating material that needs to be prepared for the coating procedure of each spatial substrate. The latter avoids preparing more coating material than needed for the painting procedure, allowing to reduce waste and costs associated with waste coating material. Moreover, the determined amount as well as information on the coating material contained in the coating material data, such as the coating material ID, can be provided to an automatic mixing machine which then mixes the determined amount based on the received data. This allows to fully automate the coating process and avoids prepared waste coating material due to mixing errors.

The at least one computer processor performing steps (d) to (f) may be the same computer processor or may be a different computer processor, i.e. the computer processor performing step (d) may be different from the computer processor performing steps (e) and (f). In one example, the computer processor performing steps (d) to (f) may be located on a server such that steps (d) to (f) are performed in a cloud computing environment and may be connected to a further computing device, which functions as a client device. "Client device" may refer to a computer or a program that, as part of its operation, relies on sending a request to another program or a computer hardware or software that accesses a service made available by a server. Preferably, the server may be an HTTP server and is accessed via conventional Internet web-based technology. The client device provides the spatial substrate data as well as the data retrieved in step (c) via a communication interface to the server. This allows to use client devices having lower computing power because the resource intensive calculations are performed on the server. The internet-based system is in particular useful, if the service of generating robot path data is provided to customers over the internet.

Embodiments of the Inventive Computing Apparatus

In an aspect, the inventive computing apparatus further comprises at least one database containing the spatial substrate data, the coating parameter data, the coating procedure data, the substrate type data, the coating material data, or a combination thereof.

In one example, the aforementioned data may be stored in a single database. In another example at least part of the spatial substrate data, the coating parameter data, the coating procedure data, the substrate type data and the coating material data may be stored in the same database, i.e. a database may comprise, for example, the spatial substrate data and the coating material data. In yet another example, the aforementioned data may each be stored in a separate database.

Embodiments of the Inventive Robotic System

The robotic system may comprise an inventive computing apparatus for generating robot path data and a robot apparatus configured to receive the generated robot path data and to use the received robot path data to apply at least one coating material to at least part of the surface of each spatial substrate. The robotic system may comprise a computing apparatus for generating robot path data comprising at least one processor and a memory storing instructions that, when executed by the processor, configure the apparatus to perform the steps of the methods disclosed herein.

In an aspect, the robot apparatus comprises at least one movable robot member comprising a coating tool and a robot controller adapted to receive the generated robot path data from apparatus and operable to move the at least one moveable robot member in accordance with the received robot path data to coat at least part of the surface of each spatial substrate with the at least one coating material. The coating tool is preferably a coating material applicator, such as a spay applicator commonly used to apply liquid or solid coating material to at least part of the surface of a substrate.

The at last one movable robot member may be a movable robot arm configured to comprise a coating tool.

In an aspect, the robot apparatus further comprises a sensor system configured to generate data of the workspace of the robot and/or data being indicative of the geometry and the color of each spatial substate and to provide the generated data to the inventive computing apparatus. The sensor system is preferably also used to acquire data of the geometry and color of each spatial substrate based on scan path data provided to the robot controller. The term "comprises" includes a permanently attached sensor system as well as a temporary attached sensor system. The sensor system is preferably attached to the at least one movable robot member of the robot apparatus. In one example, the robot apparatus comprises a movable robot member comprising the coating tool as well as the sensor system. In another example, the robot apparatus comprises a first movable robot member comprising the coating tool and a second movable robot member comprising the sensor system. In yet another example, the robot apparatus comprises only one movable robot member which either comprises the coating tool or the sensor system, i.e. the coating tool and sensor system are only temporary attached to the movable robot member. Temporary attachment of the sensor system may be beneficial to avoid application of the coating material onto the sensor system which may lead to reduced performance or failure of the sensor system. Switching between the coating tool and the sensor system may be performed as described later on using a tool changer.

The sensor system may comprise a depth sensor and may be selected from one of a camera system and a laser scanner, such as a laser scanners commercially available from Framos GmbH. The camera system or laser scanner must be able to acquire color data and data on the geometry of the workspace of the robot and/or the spatial substrate, such as 3D point cloud data.

In an aspect, the robotic system comprises a plurality of coating tools, each coating tool comprising at least one coating material reservoir containing a different coating material and being connectable to the robot apparatus, in particular to the movable robot member. The robot apparatus is preferably configured to select the appropriate coating tool from a plurality of coating tools based on the coating material data received from the computing apparatus. The coating tool may comprise a code, bar code or unique ID allowing the robotic apparatus to identify the coating tool to be attached and the robot apparatus may be configured to identify the appropriate coating tool based on the code, bar code or unique ID attached to the tool and to attach the appropriate coating tool to the robot apparatus, in particular the movable robot member.

The robotic system is preferably installed in a spray booth which further comprises heating means. The heating means may be used for drying and/or curing the applied coating material(s) to form a cured coating on each spatial substrate. In contrast to a dried coating which is still tacky and undergoes further property changes upon use of curing conditions (such as heat), a cured coating is a solid coating that does not undergo any further property changes upon exposure to curing conditions. The heating means may be controlled by the computing apparatus of the inventive system which may be configured to control the heating means by retrieving a drying and/or curing temperature and a drying and/or curing duration based on the provided coating material data, for example by retrieving appropriate drying and/or curing temperature(s) from a database using the coating material type ID or coating material ID contained in said data, and providing the retrieved temperature(s) and duration to the heating means. The heating means may be switched on after the robot controller provides a signal to the computing apparatus indicating the end of the coating procedure or the end of the application of a specific coating material, for example after the robot apparatus returns to the initial pose after the last coating material has been applied to each spatial substrate or after the robot apparatus returns to the tool rack to exchange the current coating tool against another coating tool comprising a different coating material. This allows to fully automate the coating and curing process, thus reducing the human interaction to a minimum and allowing to provide a repeatable coating procedure despite the high variety of the substrate geometry.

BRIEF DESCRIPTION OF THE DRAWINGS

These and other features of the present invention are more fully set forth in the following description of exemplary embodiments of the invention. To easily identify the discussion of any particular element or act, the most significant digit or digits in a reference number refer to the figure number in which that element is first introduced. The description is presented with reference to the accompanying drawings in which.

DETAILED DESCRIPTION

Figure 1:
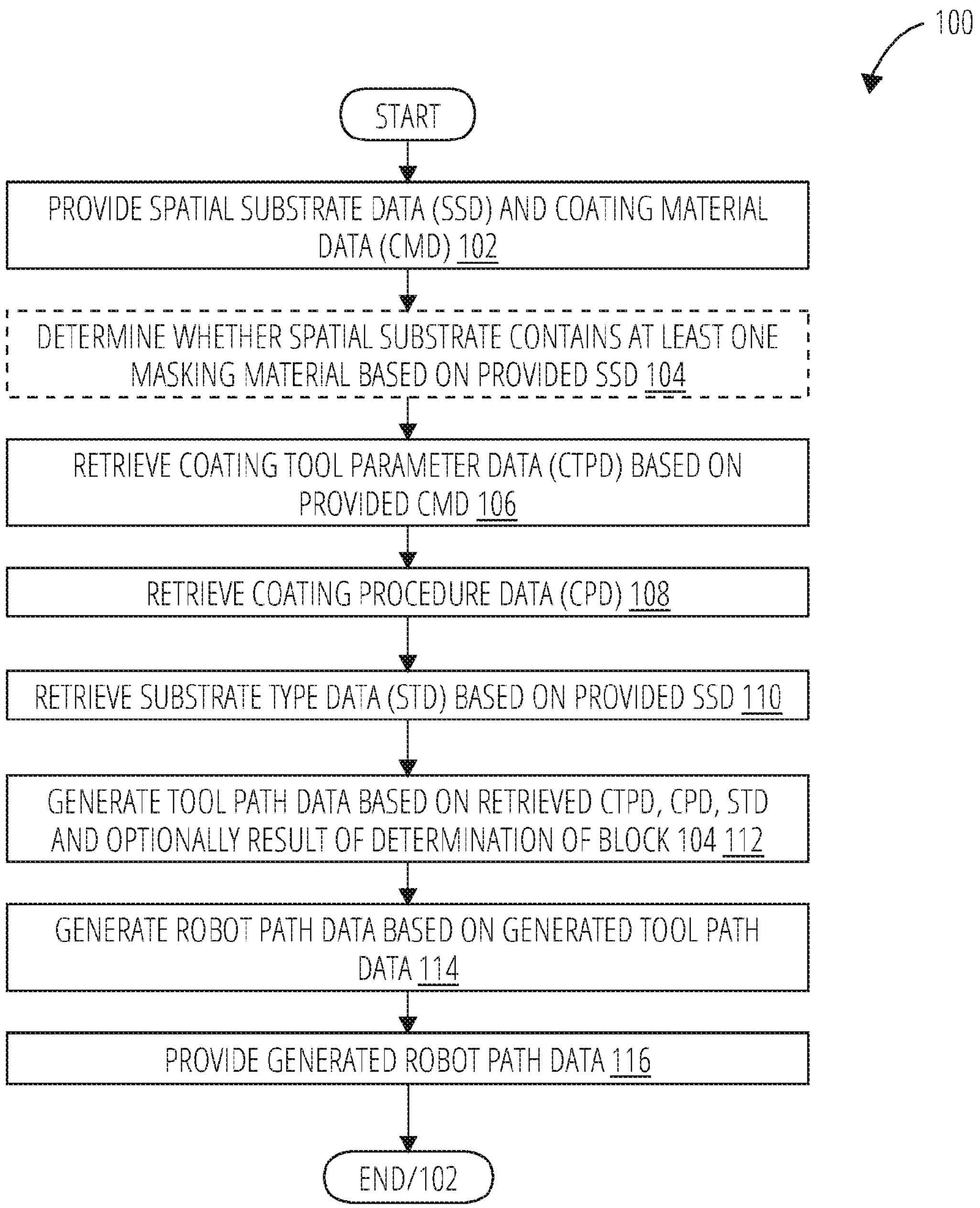
FIG. 1 illustrates a flow diagram of a first embodiment of the inventive method for generating robot path data for robot path(s) to be followed by a robot comprising a coating tool during coating at least part of the surface of the spatial substrate with at least one coating material.

The detailed description set forth below is intended as a description of various aspects of the subject-matter and is not intended to represent the only configurations in which the subject-matter may be practiced. The appended drawings are incorporated herein and constitute a part of the detailed description. The detailed description includes specific details for the purpose of providing a thorough understanding of the subject-matter. However, it will be apparent to those skilled in the art that the subject-matter may be practiced without these specific details.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in relation to FIG. 6, which, in turn, can be implemented by one or more Hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry described in relation to FIG. 6. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry as described in relation to FIG. 6. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

FIG. 1 illustrates a flow diagram of a first non-limiting embodiment of a method 100 for generating robot path data for robot path(s) to be followed by a robot comprising a coating tool during coating at least part of the surface of at least one spatial substrate with at least one coating material, said method being implemented by a computing device comprising a computer processor. Method 100 may be used for coating at least part of a surface of a spatial substrate with a coating material using a robotic system comprising a robot containing coating tool. The computing device may be the computing system described in relation to FIG. 6 below and may be a stationary device, such as a stationary computer preferably comprising a computer monitor, or a mobile computing device or may be located in a cloud computing environment. The spatial substrate to be coated may be an automotive part, such as an automotive body part, for example an automotive fender. The spatial substrate to be coated may be an automotive hood, an automotive door and automotive bumper cover or any other spatial automotive substrate. A plurality of spatial substrates may be coated which may be of the same substrate type or of a different substrate type. Hence, a plurality of spatial substrates with various geometric shapes may be coated. The automotive fender may comprise a conversion layer but may be free of further coating layers. The automotive fender may already comprise at least one primer, primer-surfacer or basecoat layer. A colored basecoat material and a clearcoat material may be applied by the robot comprising the coating tool. More or less coating materials may be applied by the robot. The robot may be located within a spray booth, for example as described in relation to FIGS. 7 to 11 below.

In block 102, spatial substrate data of each spatial substrate and coating material data may be provided to the computing device implementing method 100. The provided spatial substate data may at least comprise or include substrate classification data and data being indicative of the geometry and the color of the spatial substrate, in particular the surface of the spatial substrate. In this example, the spatial substrate data includes data representing the spatial substrate in 3D space, in particular 3D point cloud data of the spatial substrate, as well as color data of the spatial substrate, in particular RGB data or static image data acquired by the scanning device (or sensor system) described in relation to FIG. 7 later on. In this example, the spatial substrate data further comprises data being indicative of the identity of the substrate, such as the substrate ID, a substrate name, a bar code, a QR code, as well as a rule set to smooth the surface of a 3D model generated from data being indicative of the geometry and color of the spatial substrate.

The spatial substrate data may be provided as described in relation with FIG. 2 below. The spatial substrate data may be retrieved from a data storage medium, such as the internal storage of the computing device implementing method 100 or a database connected via a communication interface with the computing device. The stored spatial substate data may be interrelated with a substrate ID to allow retrieval of the spatial substrate data using the substrate ID. The substrate ID may be entered by the user via a graphical user interface allowing the user to enter a substrate ID or select the substrate ID from a list of substrate IDs for which spatial substrate data is available.

The coating material data comprises data being indicative of the identity of the coating material. The data being indicative of the identity of the coating material may include the name of each coating material type, i.e. basecoat and clearcoat. The data being indicative of the identity of the coating material may include an ID for each coating material type. Providing the coating material data may include displaying a user interface by the computing device allowing the user to select a coating material type from a displayed list of available types. The user interface may allow the user to type the ID or name of each coating material type. The user interface may allow the user to provide the ID/bar code/QR code of the coating material to be applied by the coating tool of the robot and the computing device may retrieve data being indicative of the identity of the coating material from a data storage medium based on the provided ID/bar code/QR code.

The coating material data may further include data being indicative of the identity of the coating material, such as the ID, a bar code, a QR code, property data of the coating material, such as chemical and/or physical property data, data on the composition of each coating material, or a combination thereof. The coating material data may further include data being indicative of the spatial substrate to be coated with the coating material(s). This may be especially preferred if a plurality of spatial substrates is to be coated with different coating materials to ensure that the correct coating material(s) are applied on each spatial substrate. The property data and data on the composition may be stored on a data storage medium and may be retrieved by the computing device using the provided data being indicative of the identity of the coating material.

The order of the basecoat and clearcoat to be applied with the coating tool of the robot may not be provided by the user but may be determined by the computing device using a rule set stored on a data storage medium connected to the computing device. The order of the basecoat and clearcoat to be applied with the coating tool of the robot may not be provided by displaying a user interface prompting the user to select the order of the provided coating material types.

Data being indicative of the coating tool may not be provided by the user but may be retrieved from a data storage medium based on the provided coating material type or coating material ID. Data being indicative of the coating tool may be provided by displaying a user interface prompting the user to select the coating tool, for example by displaying a list of available coating tools.

In block 104, method 100 may determine whether the surface of the spatial substrate comprises at least one masking material based on the spatial substrate data provided in block 102, this step being generally optional. Block 104 may be performed to reduce consumption of the applied coating materials and to avoid overspray because areas covered with masking material may be excluded when determining tool path data and thus robot path data to avoid application of coating material onto the masking material. Block 104 may be performed by the computing device performing the other blocks of method 100 or by a further computing device, such as a server device being connected to the computing device via a communication interface and having access to a trained machine learning model used to determine the presence of masking materials on the spatial substrate. In this case, the computing device may function as client device and may provide the spatial substate data to the server device. The server device may then use the provided spatial substate data and the trained machine learning model to determine the presence of masking material and may provide the result of the determination to the computing device. Use of a further server device to determine the presence of masking materials may be beneficial because the trained machine learning model can be stored in a database only accessible to the server, thus reducing the overall system complexity. Moreover, the feedback of the user concerning the correct determination of the masking materials may be used by the server device to improve the trained machine learning model using commonly known learning techniques.

Determining whether the spatial substrate comprises at least one masking material based on the provided spatial substrate data may include generating a three-dimensional (3D) model using the provided spatial substrate data and providing the generated 3D model to a trained machine learning model, in particular a deep learning algorithm. The 3D model may be created using the 3D point cloud data and the color data contained in the provided spatial substrate data, i.e. the 3D model is a 3D color model. Generation of the 3D model from the point cloud data and color data may be performed according to methods well known in the state of the art.

The machine learning model may have been trained on historical data of masking materials, in particular on historical 3D color models of spatial substrates containing masking material(s), to determine the presence of masking material(s) on the surface of spatial substrates based on provided historical spatial substrate data. The machine learning model, in particular the deep learning algorithm, may be hosted by the computing device implementing method 100, a remote server or a cloud or other server. Advantageously, by locating the algorithm on a remote server or a cloud server, costs of added memory and/or a more complex processor in using the algorithm to determine the presence of masking material(s) on the surface of each spatial substrate can be avoided. Additionally, continuous, or periodic improvement of the algorithm can more easily be done on a centralized server and avoid data costs and risks of pushing out an update of the algorithm to each computing device. A remote server may also serve as a central repository storing training and/or collections of operative data sent from various computing devices to be used to train and develop existing algorithms. For example, a growing repository of data can be used to update and improve algorithms on existing systems and to provide improved algorithms for future use.

The trained machine learning algorithm used in block 104, more specifically the artificial neural network (ANN) model, may be obtained using commonly known machine learning methods to train the ANN model to determine the presence of masking materials on 3D color models of spatial substrates. An exemplary commercially available software to implement the training process is Keras (available on the Internet at Keras.io), an open source ANN model library that runs on top of either TensorFlow or Theano, which provide the computational engine required. TENSORFLOW (an unregistered trademark of Google, of Mountain View, Calif.) is an open source software library originally developed by Google of Mountain View, Calif. and is available as an internet resource at www.tensorflow.org.

The model training data sets used for training of the machine learning model may be divided into three portions: the training set, the validation set, and the verification (or "testing") set. The training set is used to adjust the internal weighting algorithms and functions of the hidden layers of the neural network so that the neural network iteratively "learns" how to correctly recognize and classify patterns in the input data. The validation set, however, is primarily used to minimize overfitting. The validation set typically does not adjust the internal weighting algorithms of the neural network as does the training set, but rather verifies that any increase in accuracy over the training data set yields an increase in accuracy over a data set that has not been applied to the neural network previously, or at least the network has not been trained on it yet (i.e. validation data set). If the accuracy over the training data set increases, but the accuracy over then validation data set remains the same or decreases, the process is often referred to be "overfitting" the neural network and training should cease. Finally, the verification set is used for testing the final solution in order to confirm the actual predictive power of the neural network.

In one example, approximately 70% of the developed or collected data model sets are used for model training, 15% are used for model validation, and 15% are used for model verification. These approximate divisions can be altered as necessary to reach the desired result. For example, about 300 sets of data may be collected, each set including 3D models of spatial substrates comprising masking material(s) and being free of masking materials. The training data set may include samples throughout a full range of expected spatial substrates and positions and types of masking material(s) on said substrates.

The result of the determination may be provided to the computing device and the computing device may display the result of the determination in a graphical user interface to allow the user to check whether masking materials present on the spatial substrate have been recognized correctly. The provided result may represent an overlay of the 3D model processed by the machine learning model on top of the unprocessed 3D model (i.e. the 3D model generated from the spatial substrate data). A 3D color model comprising a classification of which surface areas contain masking material(s) may be provided to the display device for display on the screen, for example within a graphical user interface.

This allows the user to check whether the presence and location of masking material(s) was correctly detected by the trained machine learning model and allows to correct the presence and location if the masking material(s) present on the spatial substrate were not correctly determined.

In block 106, the computing device implementing method 100 may retrieve coating tool parameter data based on the coating material data provided in block 102. If more than one coating material is to be applied, i.e. the coating material data provided in block 102 may contain data on more than one coating material type, coating tool parameter data associated with each coating material type contained in the provided coating material data may be retrieved in block 106. The coating tool parameter data may include coating tool tolerance data and at least one application parameter associated with the coating tool used by the robot to coat at least part of the surface of the spatial substrate with the respective coating material. The coating tool parameter data may be stored in a database connected to the computing device via a communication interface and data contained in the coating material data provided in block 102, such as the name or ID of the type of coating materials to be applied, may be used by the computing device to retrieve the appropriate coating tool parameter data. Retrieving coating tool parameter data based on the coating material data provided in block 102 may include retrieving data being indicative of the type of the coating materials (i.e. basecoat and clearcoat) contained in the provided coating material data and retrieving the coating tool parameter data associated with the basecoat and the clearcoat.

The coating tool tolerance data may include target distance data, overlap percentage data, pattern size data, rotational tolerance(s) about the z-axis of the coating tool, rotational tolerance(s) about the x-axis of the coating tool and rotational tolerance(s) about the y-axis of the coating tool. Target distance data and overlap percentage may refer to a defined target distance value/overlap percentage and/or a target distance range/overlap percentage range. For example, the target distance data may comprise a range from 4 to 8 inches and the overlap percentage data may comprise a range of 70 to 90% for basecoat materials. For clearcoat materials, the target distance data may comprise a range of 6 to 10 inches and the overlap percentage data may comprise a range of 40 to 60% The target distance data and overlap percentage data may each comprise a defined value, such as 6 inches for basecoat materials and 8 inches for clearcoat materials, as well as an allowable range to allow to generate appropriate tool path data. Combination of a defined value and a range allows to use the defined value as a starting point for generation of tool path data and to adapt said starting point with the provided range if it is required to generate tool path data having the required quality. The overlap percentage data may remain fixed while other parameters may be adjusted during generation of the tool path data. The overlap percentage data may be adjusted during generation of the tool path data. The pattern size data may be fixed for a certain target distance and may scale with said target distance. For example, if one assumes a 10 inch tall and 1.5 inch wide pattern for a target distance of 6 inch and a 14 inch tall and 2.5 inch wide pattern for a target distance of 12 inch, one can use a linear interpolation between these two points to obtain the pattern size data in between these two points. The pattern size data may comprise rules that correlate the given target distance with a certain pattern size or pattern size range. The rotational tolerance about the z-axis (roll) as well as of the y-axis (yaw) of the coating tool may be within 15° of the normal surface vector and the rotational tolerance about the x-axis (pitch) of the coating tool may be within 5° of the normal surface vector.

The at least one application parameter associated with the coating tool may include the flow rate of the coating material, the voltage applied to the coating material, the pressure applied to the coating material and the bell speed of the coating tool. This may be preferred if the coating tool corresponds to an ESTA (electrostatic spray application) applicator. The at least one application parameter associated with the coating tool may include the flow rate of the coating material and the pressure applied to the coating material. This may be preferred if the coating tool corresponds to a pneumatic coating material applicator.

In block 108, the computing device implementing method 100 may retrieve coating procedure data (CPD). The retrieved coating procedure data may include a rule set for coating outer edges and edges adjacent to open space(s) and a rule set for coating main surfaces. The rule set for coating outer edges of the spatial substrate and edges adjacent to open space(s) may comprise at least one algorithm for determining outer edges and at least one algorithm for determining edges adjacent to open space(s) present within the surface spatial substrate. The algorithm for determining edges adjacent to open space(s) may further allow to determine open space(s) present with the spatial substrate which are at least partly surrounded by the determined edges adjacent to open space(s). The rule set for coating outer edges and edges adjacent to open space(s) may include rules for coating edges adjacent to open space(s), rules for coating outer edges and optionally rules of coating open space(s). At least the rules for coating edges adjacent to open space(s) and the rules of coating open space(s) may include coating tool tolerance data being different from the coating tool tolerance data contained in the retrieved coating tool parameter data. This allows to modify the retrieved coating tool tolerance data in case edges adjacent to open space(s) and thus also open space(s) are detected and thus allows to use different target distances and/or overlap percentages and/or pattern sizes and/or rotational tolerance(s) for coating open space(s) and their edges as well as outer edges.

The rule set for coating main surfaces may include rules for determining the start of the coating procedure, rules for coating direction, rules for rotation of coating tool within a tool path and rules for separation of surfaces. The rule set for coating main surfaces may include more or less rules. Rules to determine the start of the coating procedure may, for example, include determining a corner of the substrate and proceeding in a direction allowing to maintain a vertical orientation of coating material reservoir of the coating tool. Rules for coating direction may, for example, include coating the substrate from top-bottom or bottom-up and/or limiting tool path(s) in curvature relative to the edges of the substrate such that the tool path(s) do not follow the curvature or only follow the curvature to a certain extend. Rules for rotation of the coating tool within a tool path may include, for example, limiting the rotation such that the coating tool does not change orientation during painting a surface (or target area) of the spatial substrate. Rules for separation of surfaces may include determining separate surfaces and coating separated, i.e. adjacent, surfaces. The presence of separate surfaces (or different target areas) may be determined by determining whether the spatial substrate includes surfaces have a certain relative angularity between the resulting two faces and radius of curvature. For example, separation of surfaces is given if the determined relative angularity is from 25 to 90° and the radius of curvature is from 1 to 10 inches. Ensuring that both ranges for relative angularity and radius of curvature are fulfilled ensures that small body lines with a small radius of curvature but little difference in angularity between the two resulting faces are determined to be separate surfaces, thus avoiding unnecessary separation of surfaces of the spatial substrate. Coating separate surfaces may include coating the adjacent surfaces in an adjacent-next pattern to maintain a wet film on both adjacent surfaces. This ensures that the freshly coated surface is wet to accept overspray, and the adjacent surface to be coated has still wet overspray when it is coated.

The retrieved coating procedure data may further include a rule set for application of at least two different coating materials on the same spatial substrate. This may be preferred if the coating process allows to apply more than one coating material to the same spatial substrate, such as a basecoat material followed by a clearcoat material. The coating procedure data may not include said rule set, for example if the coating process allows to only apply a single coating material to the same spatial substrate. The rule set may contain rules for copying coating tool tolerance data used to apply the previous coating material (in this case the basecoat material) and to modify the copied data based on the coating material data provided in block 102. Moreover, the rule set may include rules to eliminate or perform determination of edges adjacent to open space(s) and thus open space(s). This allows to either coat open space(s) with the further coating material (in this example the clearcoat material) or to avoid coating the open space(s) with the further coating material, for example if a clearcoat layer is not required on the open space(s) coated with a basecoat layer.

By using rule sets during generation of the robot path data, such robot path data may be reliably generated for substrates having a high level of geometric variation This allows to coat such substrates by the robotic system using the generated robot path data such that coatings having a high optical and mechanical quality are obtained irrespective of the geometry of the respective substrate. Hence, the robot path data can be tailored to the respective substrate using such rule sets without requiring manual interaction to ensure that the geometry of the substrate is sufficiently considered during generation of the robot path data to avoid improper coating material application which may result in reduced optical and/or mechanical quality of the resulting coating.

In block 110, the computing device implementing method 100 may retrieve substrate type data (STD) based on the spatial substrate data provided in block 102. For this purpose, the at least one processor contained in the computing device may determine the substrate classification data contained in the spatial substrate data provided in block 102 and may retrieve the associated substrate type data, for example from a database or the internal memory of the computing device, the retrieved substrate type data may contain at least one rule set including at least one rule to coat edges adjacent to open space(s) for the respective type of spatial substrate, at least one rule to coat open space(s) present within the spatial substrate and at least one rotational tolerance of the coating tool. The at least one rule set may include more or less rules or may not include the rotational tolerance(s) of the coating tool.

In block 112, the computing device implementing method 100 may generate tool path data based on the retrieved coating tool parameter data, the retrieved coating procedure data, the retrieved substrate type data and the result of the determination of block 104, in case said optional block has been performed. The tool path data may be generated as described in FIGS. 3A and 3B below.

In block 114, the computing device implementing method 100 may generate robot path data based on the tool path data generated in block 112. Generating the robot path(s) may include determining collision geometries within the workspace of the robot based on the spatial substrate data and determining robot path data based on the determined collision geometries and the generated tool path data. Determination of the collision geometries ensures that the robot does not hit and destroy the spatial substrate(s) during the coating procedure. An initial pose of the robot may be determined and based on that initial pose, all subsequent robot movements may be generated allowing the robot, in particular the movable robot member described in relation to FIG. 7, to follow the generated tool path data as well as to return to the initial pose. The generated tool path data may be sorted prior to generating the robot path data. The generated robot path data may be optimized as described in relation to FIG. 4 below.

In block 116, the robot path data generated in block 114 may be provided via a communication interface. This may include providing the generated robot path data to a robot controller connected via the communication interface with the computing device as well as with a robot as described in relation to FIG. 7 later on. The generated robot path data may further be interrelated with the ID of the spatial substrate and may be provided to a data storage medium, such as a database or internal memory.

After the end of block 116, method 100 may end or may return to block 102, for example if it detects that spatial substrate data and coating material data are provided.

Figure 2:
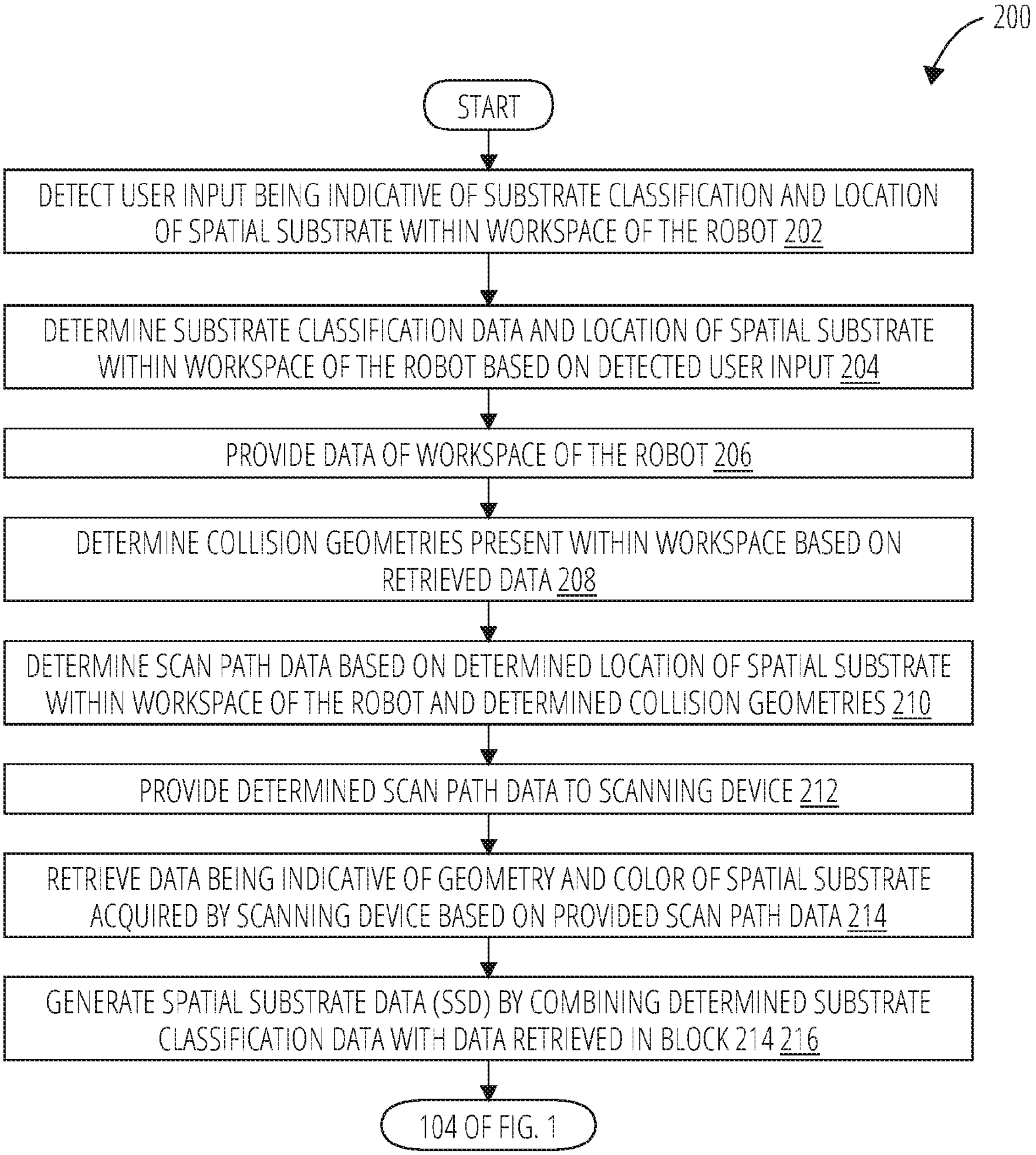
FIG. 2 illustrates a flow diagram of an embodiment for generating spatial substrate data described in relation to block 102 of FIG. 1 in accordance with implementations of the invention, FIGS. 3A,B illustrate a flow diagram of an embodiment for generating tool path data described in relation to block 112 of FIG. 1 in accordance with implementations of the invention.

FIG. 2 illustrates a flow diagram of a method 200 for generating spatial substrate data described in relation to block 102 of FIG. 1. The generated spatial substrate data may contain a substrate ID as well as a rule set to smooth the surface of a 3D model generated from data being indicative of the geometry and color of each spatial substrate. Method 200 may be performed by the computing device described in relation with FIG. 1, said computing device comprising at least one processor implementing a routine to perform the steps described in relation with the following blocks 202 to 216.

In block 202, the routine implementing method 200 may detect a user input being indicative of a substrate classification associated with each spatial substrate and a user input being indicative of the location of each spatial substrate within the workspace of the robot. The user input may be detected by displaying a user interface on a display of the computing system implementing method 100, the user interface allowing the user to select the substrate classification for each spatial substrate present within the workspace of the robot, for example by displaying a list of possible substrate classifications, such as trunk, hood, fender, etc., or by displaying a text field and prompting the user to enter the respective substrate classification(s). The user interface may also allow the user to select the location of each spatial substrate within the workspace of the robot, i.e. the spray booth, for example by displaying a map or image of the spray booth and prompting the user to select the location of each spatial substrate in the displayed map of the spray booth. The spray booth may be divided into different zones, such as 5 zones, and the user may be prompted to select all zones comprising the spatial substrate. The zones may be marked in the spray booth to facilitate selection of the zone(s) by the user. The user input may be detected via an interaction element, such as an input device or input/output device, in particular a mouse, a keyboard, a trackball, a touch screen or a combination thereof, which may be attached via a communication interface to the computing device implementing method 200.

In block 204, the substrate classification data and the location of each spatial substrate within the workspace of the robot may be determined based on the detected user input. If the user input is detected with a touchscreen device, the processor located within the touchscreen device may detect the user input and may determine the substrate classification data and location of each spatial substrate based on the detected user input. The determined data may then be provided to the computing device implementing method 200. If the user input is detected via a mouse, keyboard or trackball attached to the computing device implementing method 200, the substrate classification data and location of the substrate may be determined with the processor(s) housed within said computing device. Blocks 202 and 204 may either be performed prior to blocks 206 to 212, after block 212 or 214 or at any time prior to block 216.

In block 206, data of the workspace of the robot may be provided via a communication interface to the routine implementing method 200. Data of the workspace of the robot may be provided by scanning the workspace of the robot with a scanning device (or sensor system) attached to a movable robot member of the robot as described in relation to FIG. 7 below. The data of the workspace of the robot may include 3D point cloud data as well as color data, such as RGB or static image data. The computing device implementing method 200 may be used to control the robot comprising the scanning device via a robot controller as described in relation to FIG. 7 below. For example, the computing system may allow the user to issue command(s) regarding the scan of the workspace of the robot via the computing device to the robot controller. Scanning of the workspace of the robot may also be automatically initiated, for example upon starting the inventive method, by issuing a respective command to the robot controller by the computing device. The robot controller may then control the robot comprising the scanning device to scan the workspace and the data acquired by the scanning device may be provided via the robot controller to the computing device.

In block 208, the routine implementing method 200 may determine collision geometries present within said workspace based on the data of the workspace of the robot provided in block 206. Collision geometries may be generated by filtering the provided data of the workspace of the robot to reduce the number of data points, determining whether said data contains geometries having a certain size, creating 3D object(s) present within the workspace from extreme points and filling the generated object(s) with volume to obtain the collision geometries.

In block 210, the routine implementing method 200 may determine scan path data for scan path(s) to be followed by a scanning device along the surface of each spatial substrate based on the determined location of each spatial substrate within the workspace of the robot and the determined collision geometries, and may provide, via the communication interface, the determined scan path data to the scanning device. If the spatial substrate is present in more than one zone of the spray booth or a plurality of spatial substrates is present within different zones, the zones may be gone through in predefined order during generation of the scan path data to ensure that the complete surface of each spatial substrate is scanned by the scanning device. The determined scan path data may be provided via a communication interface to a scanning device, for example sensor device 706 described in relation to FIG. 7, which may then scan the surface of each spatial substrate based on the provided scan path data. The scanning device may be the same scanning device, or a different scanning device as used to acquire data of the workspace of the robot provided in block 206. The scanning device may be attached to the movable robot member of the robot and the determined scan path data may be provided from the computing device implementing method 200 to the robot controller controlling the robot comprising the scanning device. Performing said scan provides detailed information on the spatial substrate and allows to generate tool path data with results in consistent high optical quality in terms of appearance of the resulting coating.

In block 214, the routine implementing method 200 may retrieve the data being indicative of the geometry and color of each spatial substrate which has been acquired by the scanning device based on the scan path data determined and provided to said scanning device in block 212. For this purpose, the acquired scan path data may be assigned to a location ID and the routine may associate the location ID with the determined location of each spatial substrate to assign the acquired scan path data to the respective spatial substrate. The retrieved data may include 3D point cloud data and RGB color data or statical image data. The acquired scan data may be stored by the scanning device or by the controller controlling the scanning device, such as the robot controller or a further computing device and said data may be retrieved from said storage. The acquired scan data may be provided in real time to the computing device implementing method 200, which may store the received scan data.

In block 216, the routine implementing method 200 may generate spatial substrate data for each spatial substrate by combining the data retrieved in block 214 with the respective determined substrate classification data, the respective data being indicative of the identity of the spatial substrate and the respective rule set to smooth the surface of the generated 3D model. The rule set may be retrieved using the substrate classification data determined in block 204, for example by using a database containing rule sets, each rule set being interrelated with appropriate substrate classification data. The spatial substrate data for each spatial substrate may be generated by combining the data retrieved in block 214 with the respective determined substrate classification data. The spatial substrate data generated in block 214 for each spatial substrate may be stored on a data storage medium, such as the internal memory, prior to using said data in further blocks described in relation to FIG. 1. After the end of block 216, method 200 may proceed to block 104 of FIG. 1 described previously.

Figure 3A:
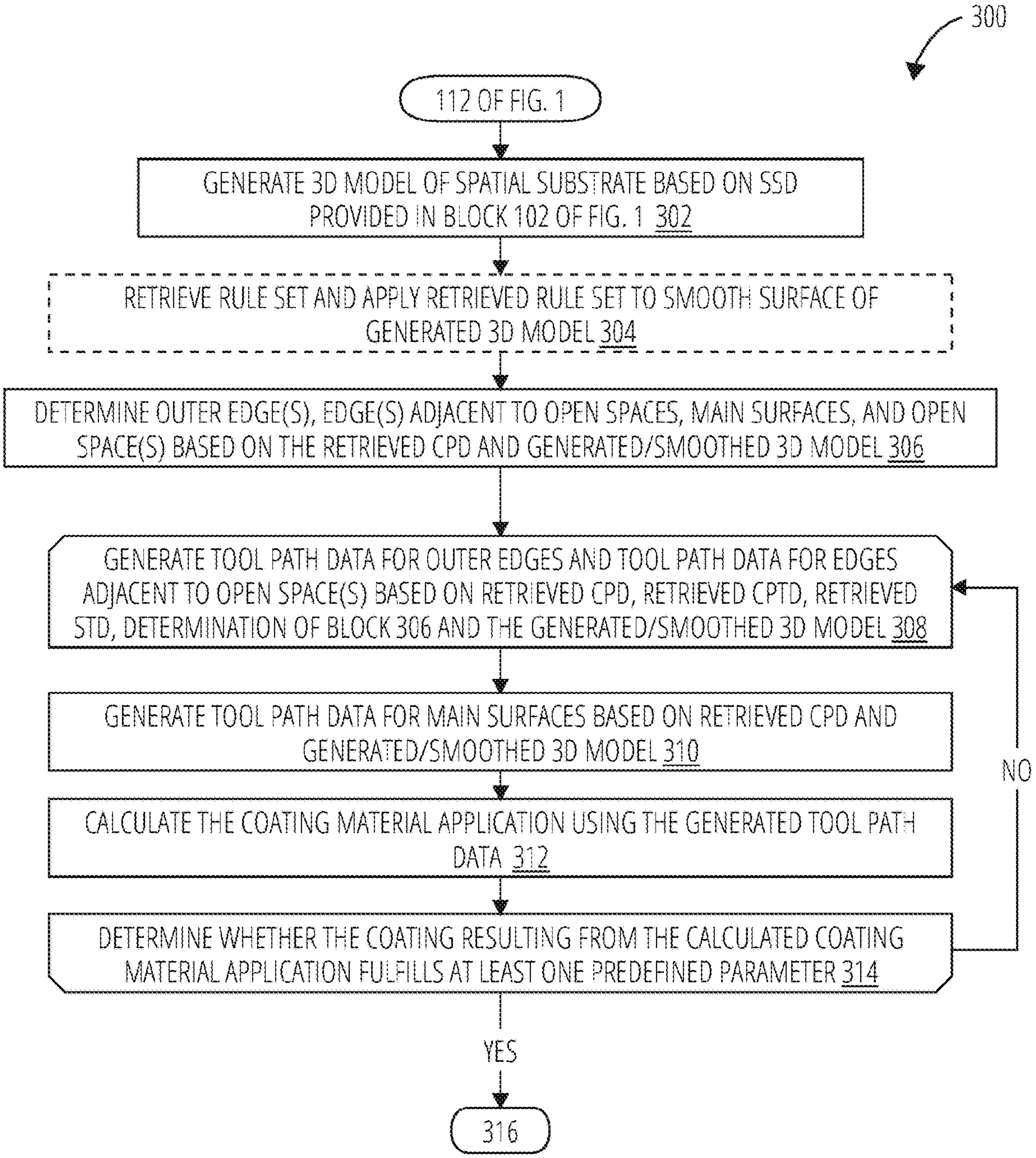
Figure 3B:
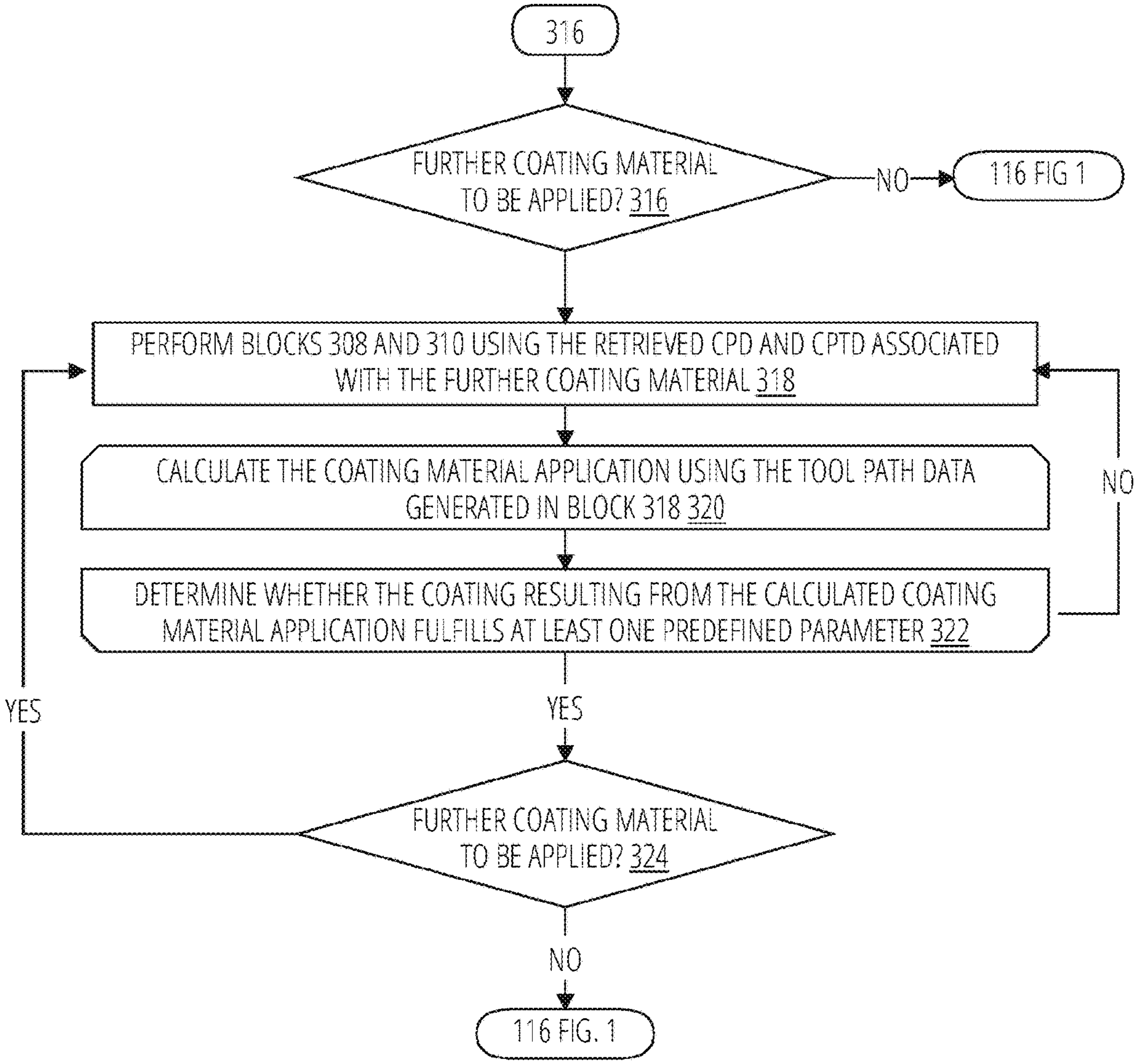

FIGS. 3A and 3B illustrate a flow diagram of a method 300 for generating tool path data described in relation to block 114 of FIG. 1. Method 300 may be performed by the computing device described in relation to FIG. 1, said computing device comprising at least one processor implementing a routine to perform the steps described in relation with the following blocks 302 to 326.

In block 302, the routine implementing method 300 may generate a three-dimensional (3D) model for each spatial substrate based on the spatial substrate data provided in block 102 of FIG. 1. The provided spatial substrate data may have been generated as described in relation to FIG. 2 above. The spatial substrate data may contain—for each spatial substrate—3D point cloud data, static image data of the spatial substrate and a rule set to smooth the surface of a generated 3D model. Generation of a 3D color model from the 3D point cloud data and the static image data may be performed using commonly known methods and software, such as the open-source library Open3D.

In block 304, the routine implementing method 300 may retrieve the respective rule set and may apply the retrieved rule set to smooth the surface of the 3D model generated in block 302 for each spatial substrate, this step being generally optional. The rule set may be contained in the spatial substrate data provided in block 102 of FIG. 1. The routine implementing method 300 may retrieve the rule set from a data storage medium, comprising rule sets interrelated with substrate classification data, based on the substrate classification data contained in the provided spatial substrate data. Smoothing of each generated 3D model may involve determining the surfaces (or areas) of the 3D model which match surface data contained in rule(s) of the rule set and applying an optimization algorithm, such as a numerical smoothing algorithm known in the state of the art, in combination with threshold values contained in said rule(s) on the determined surfaces. The threshold values may be used to control the degree of smoothing performed by the optimization algorithm. For example, if the spatial substrate type is a hatch, corners are smoothed more and an interior edge and cavities for taillights are determined whereas on a front quarter panel the corners are kept sharper and any holes that might be treated as internal edges are ignored. Use of the rule set to smooth the 3D model(s) allows to control the degree of smoothing and thus the resulting quality of the coating in terms of appearance, because the higher the degree of smoothing, the lower the resulting quality. A higher degree of smoothing may be used for surfaces, such as front light pockets present within a fender, which do not require a high quality while a lower degree of smoothing may be used for surfaces requiring a higher degree of quality, such as the part of the fender visible after mounting the coated fender to the car body. Smoothing the 3D model(s) allows to generate the tool path data more efficiently, because the meshes of the 3D model(s) obtained from the point cloud data are converted into surfaces, which can be processed more efficiently during generation of the tool path data, for example by the computer processor(s) generating the tool path data as described later on.

In block 306, the routine implementing method 300 may determine the outer edge(s), the edge(s) adjacent to open space(s), the main surfaces, and the open space(s) present within each spatial substrate based on the coating procedure data retrieved in block 108 of FIG. 1 and each 3D model generated in block 302 or each 3D model smoothed in block 304. For this purpose, the routine may retrieve the appropriate rule set and applies the rule set on each generated/smoothed 3D model. The routine may retrieve the algorithms from the rule set and may apply the algorithms to each smoothed 3D model to determine the outer edges, edges(s) adjacent to open space(s), main surfaces, and open space(s) as described previously.

In block 308, the routine implementing method 300 may generate tool path data for outer edges and tool path data for edges adjacent to open space(s) based on the coating tool parameter data and the coating procedure data associated with the first coating material (in this example the basecoat material) retrieved in blocks 106 and 108 of FIG. 1, the substrate type data retrieved in block 110 of FIG. 1 and each 3D model generated in block 302 or each smoothed 3D model generated in block 304 The tool path data for outer edges and tool path data for edges adjacent to open space(s) may be generated by determining the target distance(s), overlap percentage(s), pattern size and rotational tolerance(s) of the coating tool based on the outer edges, the edges adjacent to open space(s) and the open space(s) determined in block 306, the retrieved coating tool parameter data, the retrieved coating procedure data, the retrieved spatial substrate data, and each generated and smoothed 3D model, and generate tool path data from the determined the target distance(s), overlap percentage(s), pattern size and rotational tolerance(s) of the coating tool using each generated and smoothed 3D model.

For example if the spatial substrate is a fender or a hood, open space(s) present within the fender or hood, such as marker light pockets within the fender or hood scoop pockets within the hood, may not be treated according to rule(s) for coating open space(s) contained in the substrate type data. The front light pocket as well as the top inner rail and tabs and the lower flange on the dog-leg may be determined as open space(s) which are to be coated according to rules contained in the coating procedure data. If the spatial substrate is a door, open space(s) present within the door-except for windows-such as door handle mounting holes, may not be treated according to rule(s) for coating open space(s) contained in the substrate type data. Door jambs and window frames may be determined as open space(s) which are to be coated according to rules contained in the coating procedure data.

In block 310, the routine implementing method 300 may generate tool path data for main surfaces of each spatial substrate based on the coating procedure data associated with the first coating material (in this example the basecoat material), in particular the rule set for coating main surfaces, retrieved in block 108 of FIG. 1 and each 3D model generated in block 302 or each smoothed 3D model generated in block 304. Tool path data for main surfaces may be generated by

- determining whether main surfaces of each spatial substrate comprise at least two separate surfaces based on the retrieved coating procedure data and each generated and smoothed 3D model,
- determining whether main surfaces of each spatial substrate comprise a convex shape and creating an outer hull around said spatial substrate(s) using a convex hull method,
- determining the target distance(s), overlap percentage(s), pattern size and rotational tolerance(s) of the coating tool based on the determined separate surfaces, the determined convex shape, the retrieved coating tool parameter data, the retrieved coating procedure data, and each generated and smoothed 3D model, and
- generating tool path data from the determined the target distance(s), overlap percentage(s), pattern size, rotational tolerance(s) of the coating tool using each generated and smoothed 3D model.

The rule set for coating main surfaces may include rules for determining the start of the coating procedure, rules for coating direction, rules for rotation of coating tool within a tool path and rules for separation of surfaces. The rule set for coating main surfaces may comprise more or less rules. Rules to determine the start of the coating procedure may, for example, include determining a corner of the substrate and proceeding in a direction allowing to maintain a vertical orientation of coating material reservoir attached to the spray applicator. Rules for coating direction may, for example, include coating the spatial substrate from top-bottom or bottom-up, such as doors, or from leading edge to back edge or from side to side, such as hoods, and/or limiting tool path(s) in curvature relative to the edges of the substrate such that the tool path(s) do not follow the curvature or only follow the curvature to a certain extend. Rules for rotation of the coating tool within a tool path may include, for example, limiting the rotation such that the coating tool does not change orientation during painting a surface (or target area) of the spatial substrate. Rules for separation of surfaces may include determining separate surfaces and coating separated, i.e. adjacent, surfaces. In this example, the presence of separate surfaces (or different target areas) is determined by determining whether the spatial substrate includes surfaces have a certain relative angularity between the resulting two faces and radius of curvature. For example, separation of surfaces is given if the determined relative angularity is from 25 to 90° and the radius of curvature is from 1 to 10 inches. Ensuring that both ranges for relative angularity and radius of curvature are fulfilled ensures that small body lines with a small radius of curvature but little difference in angularity between the two resulting faces are determined to be separate surfaces, thus avoiding unnecessary separation of surfaces of the spatial substrate. Coating separate surfaces may include coating the adjacent surfaces in an adjacent-next pattern to maintain a wet film on both adjacent surfaces. This ensures that the freshly coated surface is wet to accept overspray, and the adjacent surface to be coated has still wet overspray when it is coated.

Determination of whether the spatial substrate comprises a convex hull may be performed based on each generated or smoothed 3D model by determining the surface curvature of each spatial substrate from side to side. Such convex surfaces may, for example, the present on bumper covers or on hoods. The outer shell resulting from applying a convex hull algorithm known in the state of the art to the convex surface of said spatial substrate(s) may be used to generated tool path data for said convex surface.

The steps of determining whether main surfaces of each spatial substrate comprise at least two separate surfaces and/or convex surfaces may be performed in any order.

In block 312, the routine implementing method 300 may calculate the coating material application for each spatial substrate using the tool path data generated in blocks 308 and 310. Calculation of the respective coting material application using the generated tool path data may include simulation of the coating material application using the generated tool path data. This simulation allows to calculate a coverage map of each generated or smoothed 3D model. The calculated coverage map(s) may be provided via a communication interface, for example to a display device, which displays the received coverage map(s) within a graphical user interface (GUI). The coverage map(s) may comprise different colors to indicate whether the predefined parameter(s) are fulfilled or not. The coverage map(s) may also contain the calculated coating material application as well as the retrieved predefined parameter(s) to allow a visual comparison.

In block 314, the routine implementing method 300 may determine whether each coating of each spatial substrate resulting from the calculated coating material application on each spatial substrate fulfils at least one predefined parameter. For this purpose, the routine may compare the calculated coating material application for each spatial substrate with each retrieved predefined parameter for each spatial substrate and determines whether the calculated coating material application is inside or outside of the retrieved predefined parameter. The predefined parameters may be retrieved by the routine from a database using the provided material coating data, for example the ID of the coating material or the coating material type. The database may contain said parameter(s) interrelated with the coating material ID or coating material type. The dry and/or wet film thickness or range thereof and/or the surface area to be coated or a range thereof may be retrieved as predefined parameter(s). The coverage map(s) calculated in block 312 may be used to determine whether a certain target area of the 3D model of each spatial substrate will be coated with the appropriate percentage of the coating material such that the wet and/or dry film thickness of the resulting coating layer fulfills the retrieved predefined range of wet and/or dry film thickness. The coverage map(s) may also be used to control the thickness of transparent coating materials or the thickness of coatings on parts of the spatial substrate(s) that require certain specifications with respect to transmissibility, like ADAS (advanced driver assistant system) and radar sensors.

If at least one predefined parameter is not fulfilled, the routine may return to block 308 and may repeat blocks 308 and 310 using the result of the determination of block 314. After new tool path data has been generated upon repeating blocks 308 and 310, the newly generated tool path data may be checked using the steps described in blocks 312 and 314 above. This loop may be repeated until it is determined in block 314 that the generated tool path data fulfills at least one, in particular all, predefined parameters. Performing blocks 312 to 314 ensures that the coating resulting from applying a coating material using the robot path data generated from said tool path data fulfills predefined quality parameters, such as wet and/or dry film thickness and surface area to be coated. If the routine implementing method 300 determines in block 314 that at least one, in particular all, retrieved predefined parameters are fulfilled, it may proceed to block 316.

In block 316, the routine implementing method 300 may determine whether a further coating material is to be applied apart from the first coating material. This determination may be made based on the data contained in the coating material data provided in block 102 of FIG. 1. For example, if said data contains data for at least two different coating materials, the routine may use said information to determine the number and type of coating materials to be applied. In case the routine determines that a further coating material is to be applied, it may proceed to block 318. Otherwise, it may proceed to block 116 of FIG. 1 described previously.

In block 318, the routine implementing method 300 may generate tool path data as described in relation to blocks 308 and 310 based on the coating procedure data and coating tool parameter data associated with the further coating material.

In block 320, the routine implementing method 300 may calculate the coating material application using the tool path data generated in block 318 as described in relation with block 312.

In block 322, the routine implementing method 300 may determine whether the coating material application calculated in block 320 fulfils at least one, in particular all, predefined parameters as described in relation to block 316. If at least one predefined parameter is not fulfilled, the routine implementing method 300 may returns to block 318 and may optimize the generated tool path data as described in relation to block 314. If at least one predefined parameter is fulfilled, the routine may proceed to block 324.

In block 324, the routine implementing method 300 may determine whether at least one further coating material is to be applied as described in relation to block 316. If the routine determines that at least one further coating material is to be applied, it may proceed to block 318 described above, otherwise it may proceed to block 116 of FIG. 1.

Figure 4:
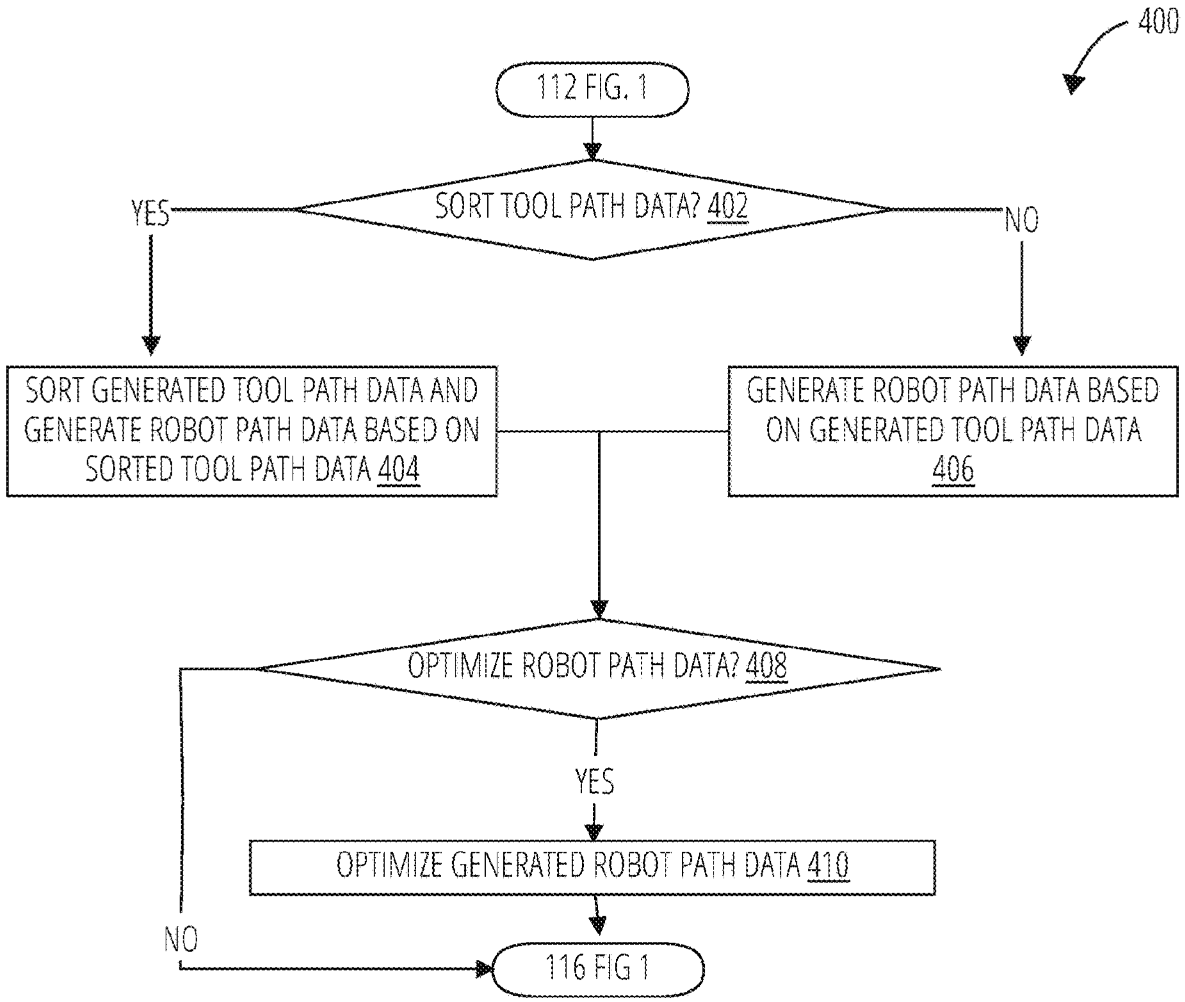
FIG. 4 illustrates a flow diagram of an embodiment of block 114 of FIG. 1 in accordance with implementations of the invention.

FIG. 4 illustrates a flow diagram of a method 400 for generating robot path data as described in block 114 of FIG. 1. Method 400 may be performed by the computing device described in relation with FIG. 1, said computing device comprising at least one processor implementing a routine to perform the steps described in relation with the following blocks 402 to 410.

In block 402, the routine implementing method 400 may determine whether to sort the generated tool path data. This determination may be made based on the data contained in the retrieved coating procedure data or based on the programming of the routine. For example, the retrieved coating procedure data may contain rules that determine that tool path data generated for outer edges and edges adjacent to open space(s) may be performed prior to tool path data generated for open space(s) and main surface(s). Performing tool path(s) for outer edges and edges adjacent to open space(s) prior to tool path(s) for open space(s) and main surfaces may be beneficial because coating of the edges generates overspray on the main surfaces which can be covered by coating the main surfaces afterwards such that a negative influence on the final overall appearance is avoided. Moreover, this avoids application of too much coating material on the edges, which is unfavorable because too much coating material present on the edges is prone to sagging, runs and heavy edges, creating a negative influence on the final overall appearance of the coated substrate. If the routine determines in block 402 that the tool path data generated in block 112 of FIG. 1 is to be sorted it may proceed to block 404, otherwise it may proceed to block 406 as described later on.

In block 404, the routine implementing method 400 may sort the tool path data generated in block 112 of FIG. 1 according to its programming or according to retrieved rule(s). The retrieved rules may be contained in the coating procedure data or may be retrieved by the routine from a data storage medium, such as a database, based on the provided coating material data. The generated tool path data may be sorted according to rule(s) contained in the retrieved coating procedure data and according to rules retrieved based on the provided coating material data. For this purpose, the routine may retrieve the appropriate rules from the retrieved coating procedure data and may apply the rules on the generated tool path data to sort the tool path data accordingly. The generated tool path data may comprise meta data indicating whether the tool path data has been generated for outer edges, edges adjacent to open space(s), open space(s) or main surfaces to facilitate sorting to the generated tool path data using said meta data. If more than one spatial substrate is to be coated, the routine may sort the generated tool path data such that all tool paths associated with a specific coating material type, such as basecoat material, are performed prior to performing all tool paths associated with a further coating material, such as clearcoat material. However, it is also possible to sort the tool path data such that one spatial substrate is completely coated prior to coating a further spatial substrate. The tool paths associated with a specific coating material, such as a primer coating material, may be performed prior to tool paths associated with a basecoat and clearcoat material for each specific spatial substrate, i.e. the tool paths for basecoat and clearcoat material or each spatial substrate may be grouped and performed in sequence such that basecoat and clearcoat material is applied per spatial substrate after applying the primer coating material to all spatial substrates.

In block 406, the routine implementing method 400 may generate robot path data using the tool path data generated in block 112 as described in relation to block 114 of FIG. 1.

In block 408, the routine implementing method 400 may determine whether to optimize the generated robot path data. This determination may be made according to the programming of the routine. Optimization of the generated or sorted robot path data may be beneficial because it allows to smoothen the motion of the robot to make it more efficient and consistent. If the routine determines in block 408 that the generated robot path data is to be optimized, it may proceed to block 410. Otherwise it may proceed to block 116 of FIG. 1 as described above.

In block 410, the routine implementing method 400 may optimize the generated robot path data. Optimization of generated robot path data may be performed, for example, using available open-source libraries, such as Descartes (ROS-Industrial project for performing path-planning on under-defined Cartesian trajectories), and software frameworks, such as trajopt (software framework for generating robot trajectories by local optimization). After the end of block 410, the routine may proceed to block 116 of FIG. 1.

Figure 5:
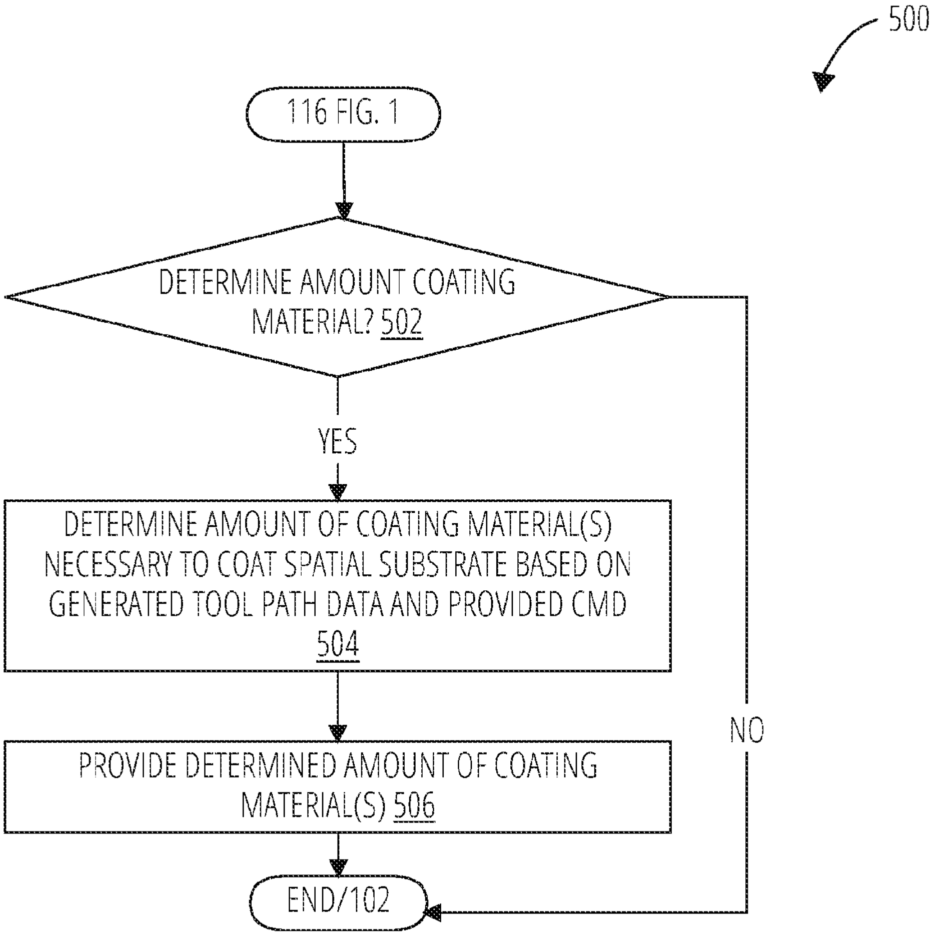
FIG. 5 illustrates a flow diagram a second embodiment of the inventive method for generating robot path data for robot path(s) to be followed by a robot comprising a coating tool during coating at least part of the surface of the spatial substrate with at least one coating material.

FIG. 5 illustrates a flow diagram of a second non-limiting embodiment of a method 500 for generating robot path data for robot path(s) to be followed by a robot comprising a coating tool during coating of at least part of the surface of a spatial substrate with at least one coating material. Method 500 may be used for coating at least part of a surface of a spatial substrate with a coating material using a robotic system comprising a robot containing coating tool. The method 500 may contain blocks 102 to 116 as described in relation to FIG. 1 as well as further blocks 502 to 506 described in the following. Method 500 may be performed by the computing device described in relation with FIG. 1, said computing device comprising at least one processor implementing a routine to perform the steps described in relation with the following blocks 502 to 506. Method 500 may be performed by a server device being connected to the computing device performing at least part of the blocks of FIG. 1 via a communication interface. In this setup, the computing device may function as client device and may provide the generated tool path data and provided coating material data to the server device. The server device may then use the received data to perform calculations and may provide the result of the calculations to the client device. This setup may be performed if the computing power of the computing device is not sufficient to perform said calculations.

In block 502, the routine implementing method 500 may determine whether the amount of each coating material necessary to coat at least part of the surface of each spatial substrate is to be calculated. This determination may be made according to the programming of the routine or may be made, for example, by displaying a graphical user interface prompting the user to select whether said calculation is to be performed or not or by offering a respective button/menu item on the graphical user interface which triggers said calculation upon detection of a user input being indicative of selecting said button/menu item. If the routine determine that the amount of each coating material is to be calculated, it may proceed to block 504. Otherwise, it may end method 500 or may proceed to block 102 of FIG. 1.

In block 504, the routine implementing method 500 may calculate the amount of each coating material which is necessary to coat at least part of the surface of each spatial substrate based on the tool path data generated in block 112 of FIG. 1 and the coating material data provided in block 102 of FIG. 1.

In block 506, the routine implementing method 500 may provide the calculated amount of each coating material for each spatial substrate. The calculated amount may be provided to a display device for display within a graphical user interface such that the user can prepare the required amount. The calculated amount along with the provided coating material data may be provided via a communication interface to an automated mixing machine which uses the received data to automatically prepare the calculated amount.

Performing blocks 504 and 506 may allow the user to obtain information on the amount of coating material that is going to be needed for the coating process and thus allows to use this data for inventory planning or to determine the amount of coating material that needs to be prepared for the coating procedure. The latter avoids preparing more coating material than needed for the painting procedure, allowing to reduce waste and costs associated with waste coating material. Moreover, the determined amount as well as information on the coating material contained in the coating material data, such as the coating material ID, may be provided to an automatic mixing machine which then mixes the determined amount based on the received data. This allows to fully automate the coating process and avoids prepared waste coating material due to mixing errors.

Blocks 502 to 506 may be performed after block 116 of FIG. 1. Blocks 502 to 506 may be performed after block 114 and prior to block 116 of FIG. 1. This allows to provide the generated robot path data along with the calculated amount of each coating material.

Figure 6:
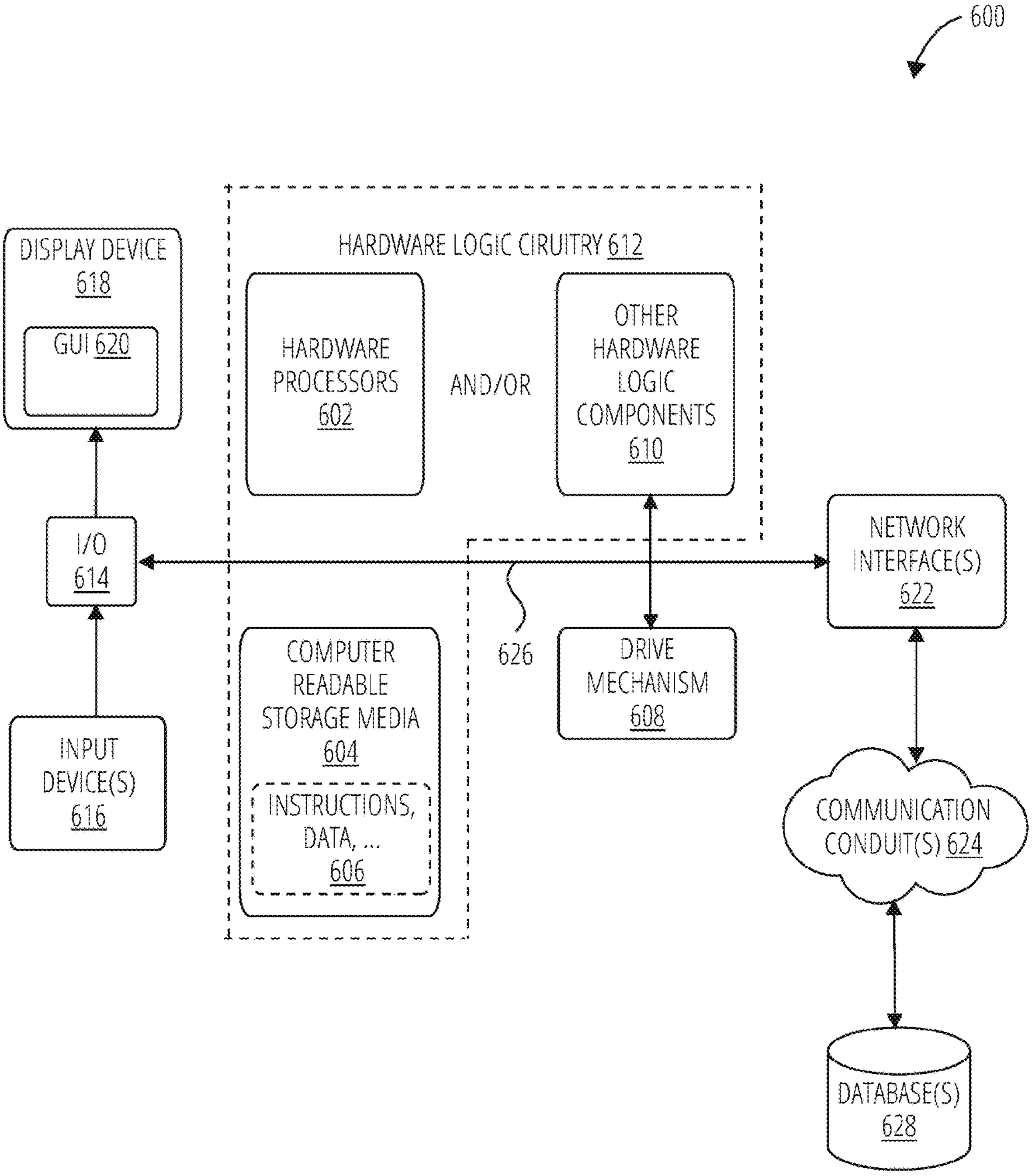
FIG. 6 illustrates a block diagram of a computing apparatus for generating robot path data for robot path(s) to be followed by a robot comprising a coating tool during coating at least part of the surface of the spatial substrate with at least one coating material in accordance with implementations of the invention.

FIG. 6 shows a computing device 600 that may be used to implement any method set forth in the above-described figures. For instance, the type of computing device 600 shown in FIG. 6 may be used to implement the methods described in relation to FIGS. 1 to 5. In all cases, the computing device 600 represents a physical and tangible processing mechanism.

The computing device 600 may include one or more hardware processors 602. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 600 may also include computer-readable storage media 604, corresponding to one or more computer-readable media hardware units. The computer-readable storage media 604 retains any kind of information 606, such as computer- or machine-readable instructions, settings, data, etc. Computer-executable instructions comprise, for example, instructions and data which, when executed at a processor 602, cause the computing device 600 to perform a certain function or group of functions. Alternatively or in addition, the computer-executable instructions may configure the computing device 600 to perform a certain function or group of functions. The computer executable instructions may be, for example, binaries or even instructions that undergo some translation (such as compilation) before direct execution by the processors, such as intermediate format instructions such as assembly language, or even source code. Without limitation, for instance, the computer-readable storage media 604 may include one or more solid-state devices, one or more magnetic hard disks, one or more optical disks, magnetic tape, and so on. Any instance of the computer-readable storage media 604 can use any technology for storing and retrieving information. Further, any instance of the computer-readable storage media 604 may represent a fixed or removable component of the computing device 600. Further, any instance of the computer-readable storage media 604 may provide volatile or non-volatile retention of information.

The computing device 600 may utilize any instance of the computer-readable storage media 604 in different ways. For example, any instance of the computer-readable storage media 604 may represent a hardware memory unit (such as Random Access Memory (RAM)) for storing transient information during execution of a program by the computing device 600, and/or a hardware storage unit (such as a hard disk) for retaining/archiving information on a more permanent basis. In the latter case, the computing device 600 also includes one or more drive mechanisms 608 (such as a hard drive mechanism) for storing and retrieving information from an instance of the computer-readable storage media 604.

The computing device 600 may perform any of the functions described above when the hardware processor(s) 602 carry out computer-readable instructions stored in any instance of the computer-readable storage media 604. For instance, the computing device 600 may carry out computer-readable instructions to perform each block of the methods described in FIGS. 1 to 5.

Alternatively, or in addition, the computing device 600 may rely on one or more other hardware logic components 610 to perform operations using a task-specific collection of logic gates. For instance, the hardware logic component(s) 610 may include a fixed configuration of hardware logic gates, e.g., that are created and set at the time of manufacture, and thereafter unalterable. Alternatively, or in addition, the other hardware logic component(s) 610 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 6 generally indicates that hardware logic circuitry 612 includes any combination of the hardware processor(s) 602, the computer-readable storage media 604, and/or the other hardware logic component(s) 610. That is, the computing device 600 can employ any combination of the hardware processor(s) 602 that execute machine-readable instructions provided in the computer-readable storage media 604, and/or one or more other hardware logic component(s) 610 that perform operations using a fixed and/or programmable collection of hardware logic gates. More generally stated, the hardware logic circuitry 612 corresponds to one or more hardware logic components of any type(s) that perform operations based on logic stored in and/or otherwise embodied in the hardware logic component (s).

In some cases (e.g., in the case in which the computing device 600 represents a user computing device), the computing device 600 also includes an input/output interface 614 for receiving various inputs (via input devices 616), and for providing various outputs (via output devices 618). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 618 and an associated graphical user interface presentation (GUI) 620. The display device 618 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 600 can also include one or more network interfaces 622 for exchanging data with other devices, such as the robot controller 704 and the databases 708, 710, 712 and 722 of FIG. 7, via one or more communication conduits 624. One or more communication buses 628 communicatively couple the above-described components together.

The communication conduit(s) 624 may be implemented in any manner, e.g., by a local area computer network, a wide area computer network (e.g., the Internet), point-to-point connections, etc., or any combination thereof. The communication conduit(s) 624 can include any combination of hardwired links, wireless links, routers, gateway functionality, name servers, etc., governed by any protocol or combination of protocols.

FIG. 6 shows the computing device 600 as being composed of a discrete collection of separate units. In some cases, the collection of units may correspond to discrete hardware units provided in a computing device chassis having any form factor.

Figure 7:
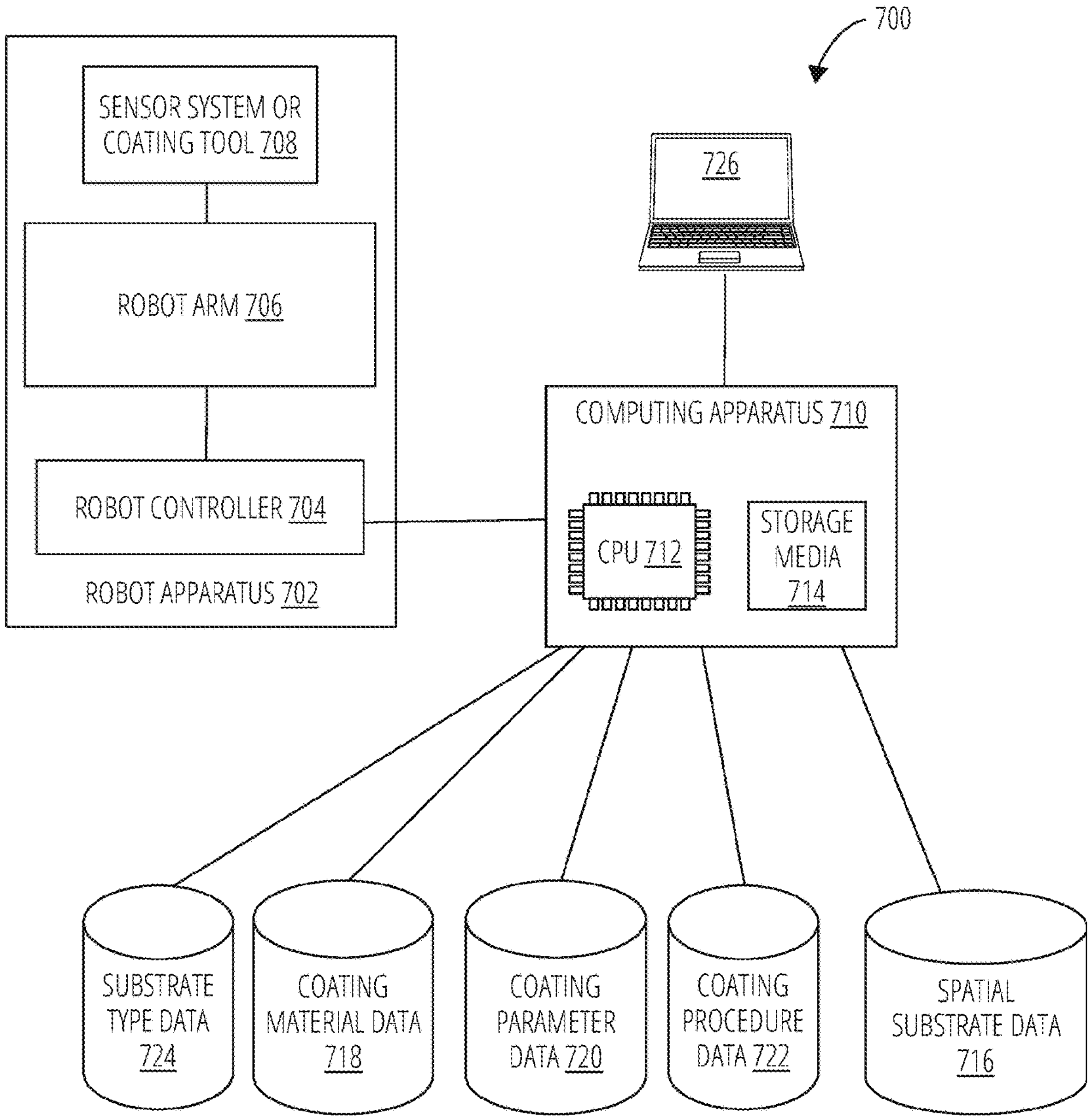
FIG. 7 illustrates a block diagram of a robotic system for coating at least one surface of a spatial substrate with at least one coating material in accordance with implementations of the invention.

FIG. 7 illustrates a block diagram of a robotic system 700 for coating at least part of a surface of a spatial substrate with at least one coating material in accordance with implementations of the invention. The robotic system may be used to implement the inventive method, for example method 100 described in relation to FIG. 1, by using the computing apparatus 718 to generate robot path data and to provide the generated robot path data via the robot controller 704 to the robot apparatus 724.

The robotic system 700 may comprise a computing apparatus 710 and a robot apparatus 702. The computing apparatus 710 may be a computing apparatus 600 as described in FIG. 6 and may comprise a CPU 712 and a storage media 714. The CPU may be a hardware processor or other hardware logic components as described in relation to FIG. 6 above. The storage media 714 may be any computer readable storage media as described in relation to FIG. 6 above. The computer readable storage media may store computer-readable instructions, such as program code, which allow the computing apparatus 710, in particular the CPU 712, to perform the inventive method, such as method 100 described in relation to FIG. 1 and method 500 described in relation to FIG. 5.

The computing apparatus 710 may be connected via a communication interface to a display device 726, which may receive data from the computing apparatus, such as the 3D model generated in blocks 302 or 304 described in relation with FIG. 3A, generated tool path data, the coverage map calculated in block 312 of FIG. 3A and/or block 324 of FIG. 3B and/or the amount of coating material calculated in block 504 of FIG. 5, and may display the received data with a graphical user interface. For this purpose, either the display device 726 or the computing apparatus 710 may generate a user interface presentation containing the respective data and may provide/display the generated user interface presentation. The display device 726 may be a mobile display device as shown in FIG. 7 or a stationary display device, such as a computer monitor. The display device may comprise a screen, such as an LCD screen, to display the graphical user interface comprising the data generated by computing apparatus 710.

The computing apparatus 710 may be connected via communication interfaces to different databases 716, 718, 720, 722 and 724. Database 716 may contain spatial substrate data, database 718 may contain coating material data, database 720 may contain coating parameter data, database 722 may contain coating procedure data and database 724 may contain substrate type data as described previously. The data contained in said databases may be interrelated with data allowing computing apparatus 710 to retrieve said data. Part of the data stored in the databases, such as the spatial substrate data, may be stored in the storage media 714 instead of in a database. At least part of the data may be stored in the same database to reduce the number of databases connected to computing apparatus.

The computing apparatus 710 may be connected to a further computing apparatus being different from computing apparatus 710 (not shown), such as a server device. The server device may be used, for example, to determine the presence of masking materials on the spatial substrate as described in relation to block 104 of FIG. 1, or to perform further blocks of the inventive method, such as method 100 described in relation to FIG. 1.

The system may further comprise a robot apparatus 702 comprising a robot controller 704 and a robot arm (or movable robot member) 706. The robot apparatus 702 may be connected to the computing apparatus 710 via the robot controller 704 using a communication interface. The robot controller 704 may be configured to receive the robot path data and optionally further commands, such as commands directed to tool changes, and to control, i.e. move, the robot using the received robot path data and further commands. The robot controller may be located outside of a spray booth to avoid a negative influence on the robot controller during the spray operation (see FIG. 9). The robot arm 706 may be any industrial automatic machine with 'n' number of degrees of freedom to which a sensor system or coating tool 708 may be automatically attached. The robot arm 706 may be located inside a spray booth (see FIG. 9 The robot arm may comprise either the sensor system or the coating tool 708. The robot arm 706 may not comprise the sensor system or coating tool 708. In this case, said system or coating tool 708 may be stored in a tool rack (see FIG. 12B). The robot arm 706 may comprise a tool changer which may be configured to attach different coating tools or the sensor system to the robot arm 706. The appropriate coating tool or sensor system 708 may be picked up by the robot arm 706 by providing the robot controller 704 with the location of the tool in the tool rack.

The sensor system 708 may be configured to generate data of the workspace of the robot as well as to acquire data on the geometry and color of the spatial substrate based on scan path data provided to robot controller 704. The scan path data may be determined as described, for example, in relation to block 210 of FIG. 2. The sensor system may comprise a depth sensor, such as a laser scanner.

Figure 12A:
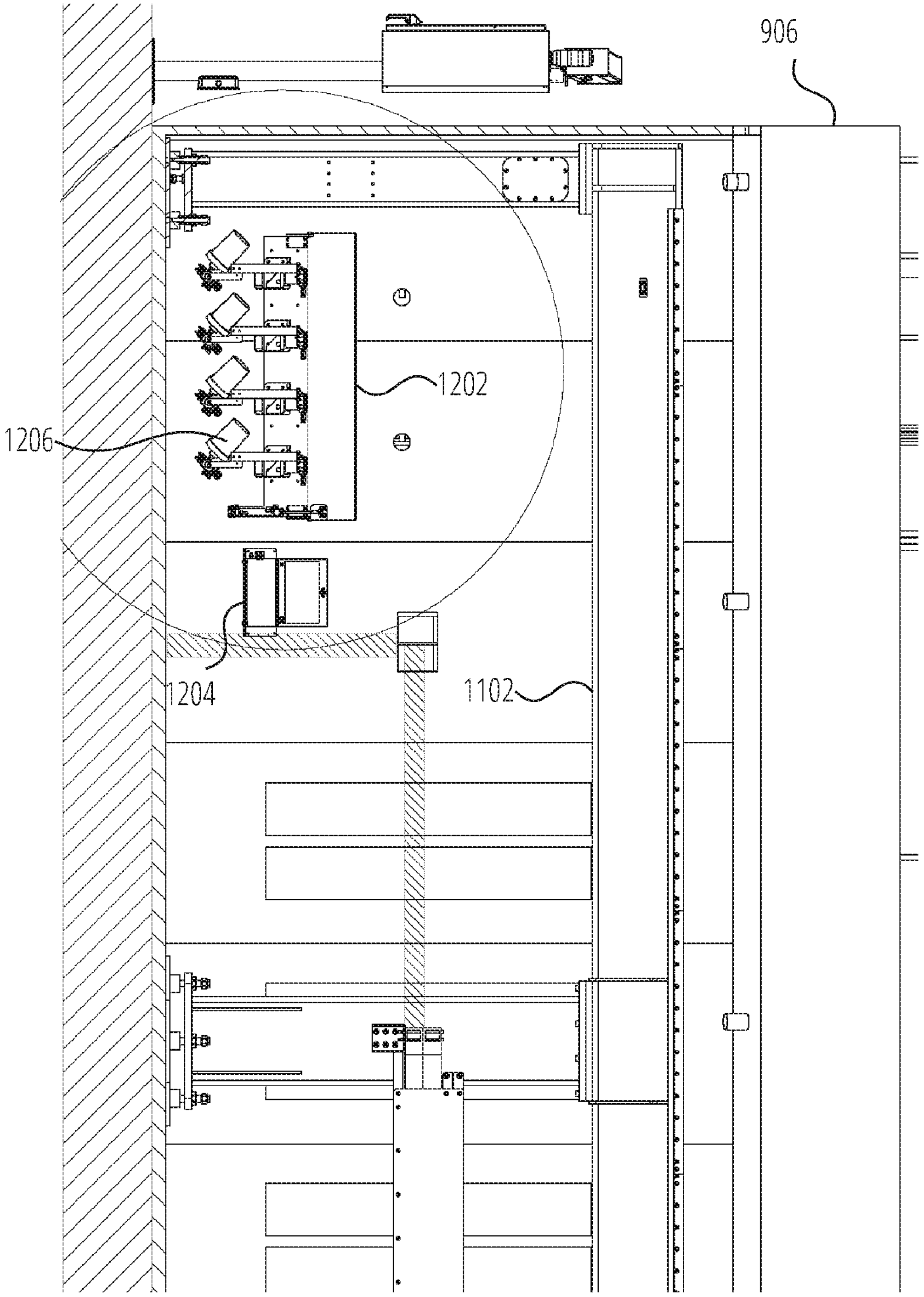
FIG. 12A illustrates a side view of part of the spray booth of FIG. 9 comprising a tool rack containing a plurality of coating tools and an enclosure housing a sensor system, the coating tools and the sensor system being connectable to the robot of FIG. 11 using a tool changer in accordance with implementations of the invention.
Figure 12B:
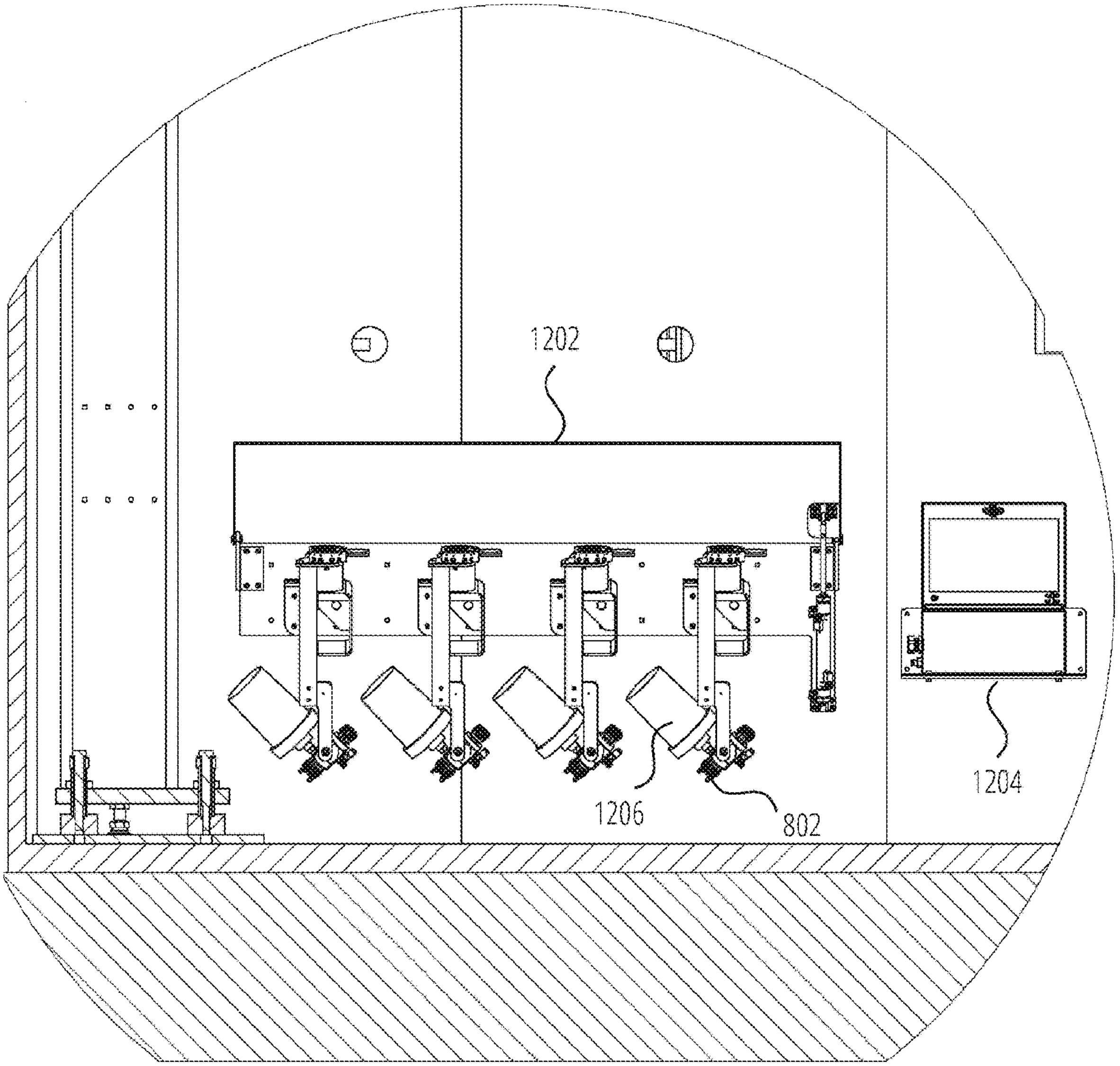
FIG. 12B illustrates a zoom-in on the tool rack and the enclosure housing the sensor system shown in FIG. 12A.

The coating tool 708 may comprise a coating applicator, such as the applicator shown in FIGS. 8A and 8B described later on. The coating tool may further comprise a coating material reservoir comprising a specific coating material as shown in FIGS. 12A and 12B.

Figure 8A:
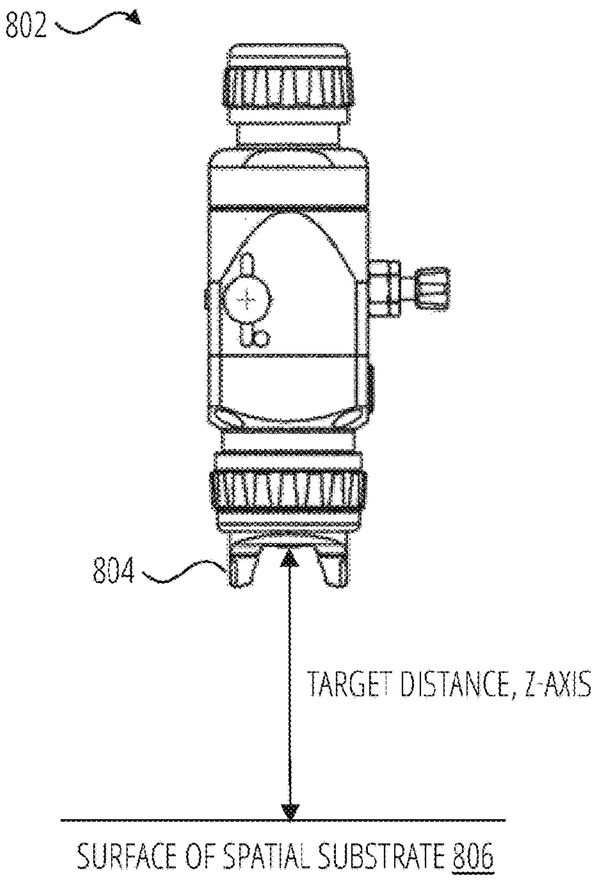
FIG. 8A illustrates the z-axis of a spray applicator of a coating tool in accordance with implementations of the invention.

FIG. 8A illustrates the z-axis of a spray applicator 802 of a coating tool in accordance with implementations of the invention. The spray applicator 802 may be an electrostatic spray applicator comprising a nozzle as well as a rotating bell 804. As shown in FIG. 8A, the target distance may be the distance between the end of the nozzle of the spray applicator 802 and the surface of the spatial substrate 806.

Figure 8B:
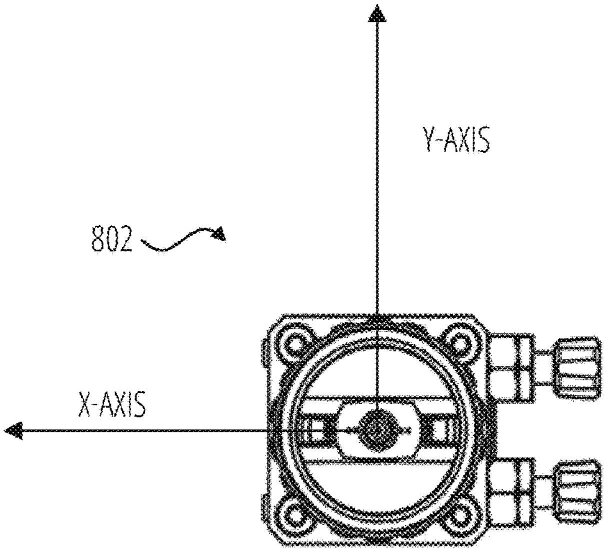
FIG. 8B illustrates the x- and the y-axis of the spray applicator of the coating tool of FIG. 8A in accordance with implementations of the invention, FIG. 9 Illustrates a schematic drawing of a spray booth containing the inventive robotic system in accordance with implementations of the invention.

FIG. 8B illustrates the x- and the y-axis of the spray applicator 802 of the coating tool of FIG. 8A. FIG. 8B shows a top view of the spray applicator 802 of FIG. 8A and illustrates the movement of the spray applicator 802 in the vertical and horizontal direction.

Figure 9:
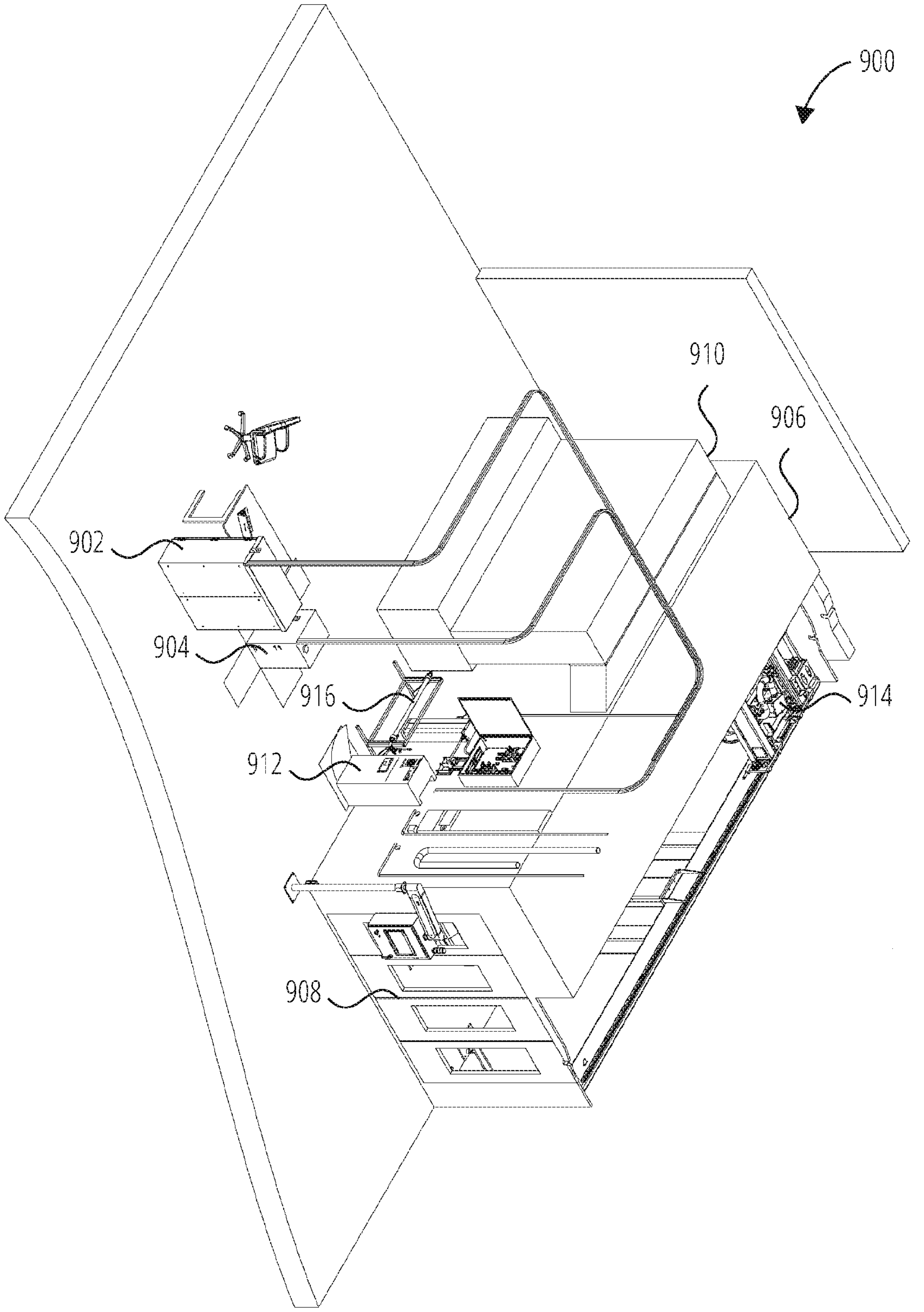

FIG. 9 illustrates a schematic drawing of an example system 900 containing a spray booth 906 and the inventive robotic system, such as robotic system 700 of FIG. 7.

The system 900 may contain an electrical cabinet 902 housing the electricity necessary for using system 900. The system 900 may further contain a chiller 904 as well as a heat exchanger 916 for the purge air for the robot apparatus, such as the robot arm 706 and/or the coating tool 708 described in relation to FIG. 7.

The system 900 may further comprise a spray booth 906 comprising spray booth doors 908 to allow placement of the spatial substrate within the spray booth as well as to allow removal of the coated spatial substrate from the spray booth. The spray booth may comprise means for heating (not shown), such that the coating material(s) applied by the robot arm can be dried and/or cured within the spray booth without having to remove the coated spatial substrate and placing the coated spatial substrate within a separate oven.

The system 900 may further comprise spray booth ventilation 910 to allow ventilation of the spray booth to remove residues of coating material or volatile compounds evaporating from the applied coating material(s) upon drying and/or curing of the resulting coating film.

The system 900 may further comprise robot controller 912 outside of spray booth 906. This ensures that the robot controller 912 is not negatively influenced by the spray mist as well as the evaporating volatile compounds present within the spray booth during spraying and curing. The robot controller 912 may be connected to robot 914. The robot 914 may comprise a robot arm (see FIG. 11). Suitable robots include robots configured for spraying tasks, such as the FANUC P-50iB/15, which is a 6-axis industrial robot commercially available from Fanuc. The robot may be fixed to a gudel rail system to allow movement of the robot within the spray booth.

Figure 10:
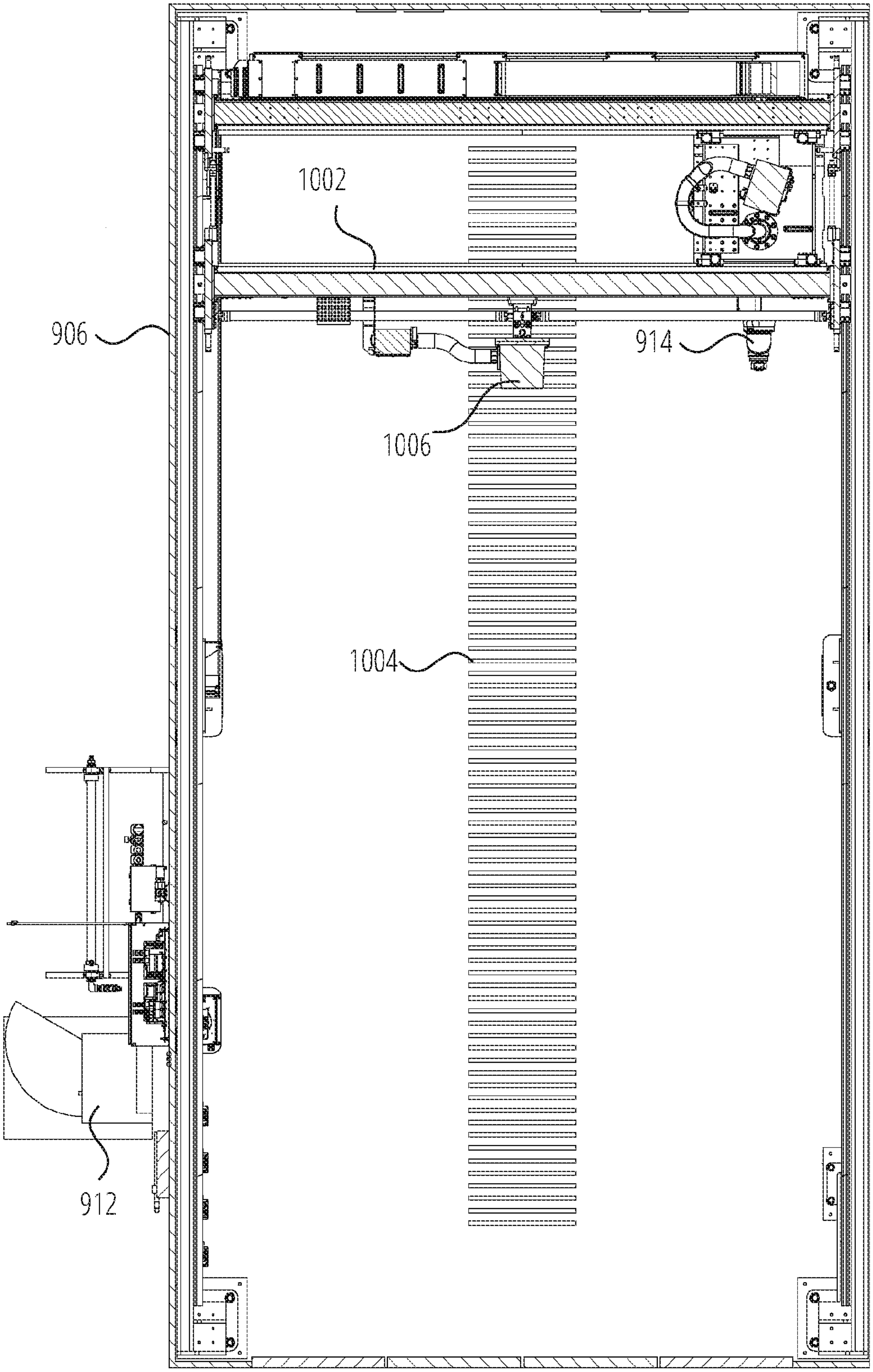
FIG. 10 illustrates a top view of the spray booth of FIG. 9 in accordance with implementations of the invention.

FIG. 10 illustrates a top view of the spray booth 906 and the robot controller 912 of FIG. 9. The robot 914 may be fixed on a bar 1002 which allows movement of the robot along the length of the spray booth 906 using the gudel rail system such that the robot can reach possible locations of the spatial substrate within the spray booth 906. The spray booth may further contain an air outlet 1004 which allows the air provided into the spray booth from the ceiling to flow out through the air outlet. The gantry axis motor configured to move the robot along the spray booth may reside in an explosion proof box 1006 to avoid explosions during spraying solvent-based liquid coating materials containing explosive liquids.

Figure 11:
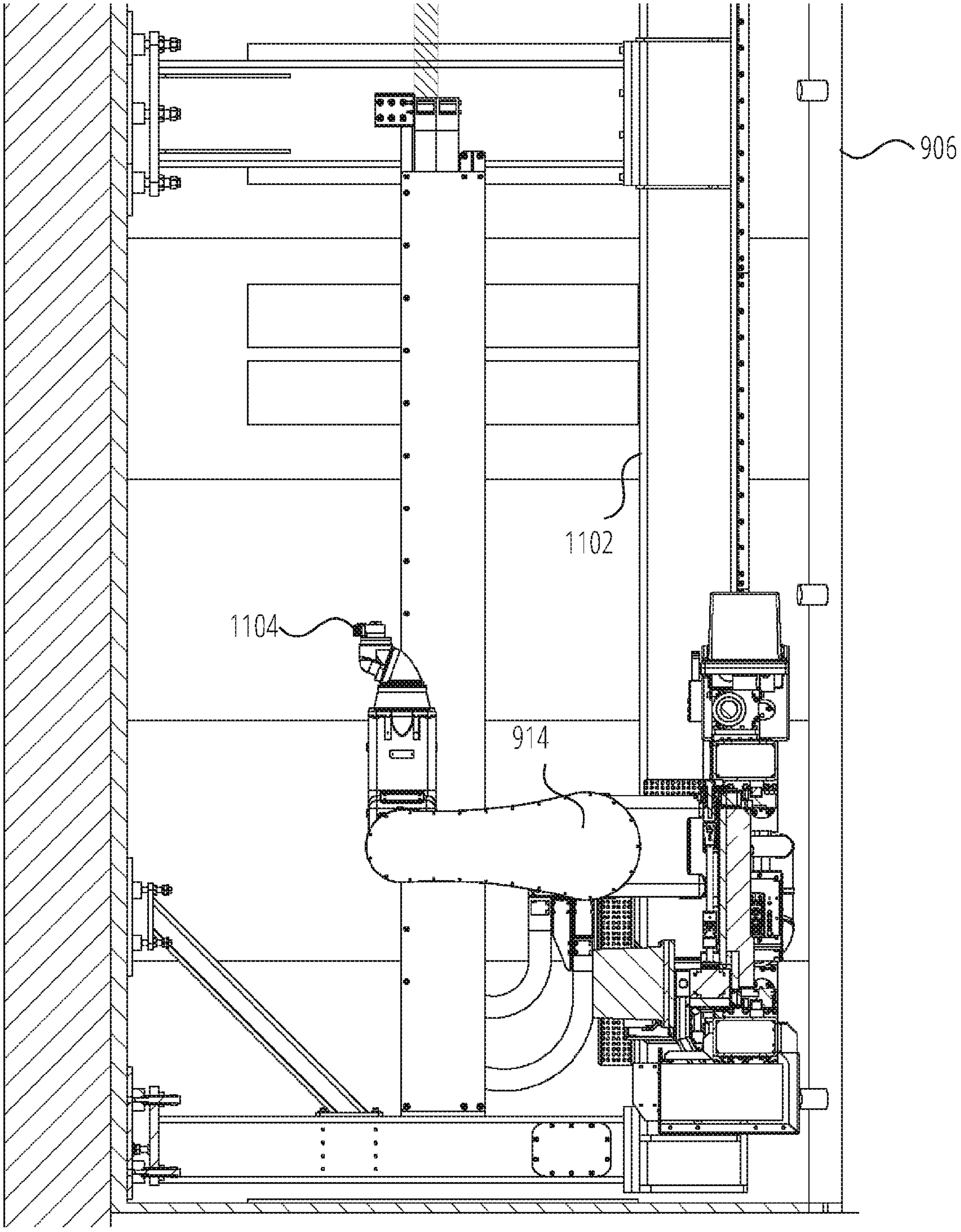
FIG. 11 illustrates a side view of the part of the spray booth of FIG. 9 in accordance with implementations of the invention.

FIG. 11 illustrates a side view of the part of the spray booth 906 of FIG. 9. A sensor system 706 may be attached to the robot 914. The robot 914 may not have a sensor system or coating tool attached. The robot 914 may have a coating tool (see FIGS. 12A, 12B) attached. The gudel rail system 1102 may be used to move the robot 914 as described previously.

FIG. 12A illustrates a side view of part of the spray booth 906 of FIG. 9 comprising a tool rack containing a plurality of coating tools, an enclosure housing the sensor system and a gudel rail system 1102.

The tool rack 1202 may contain a plurality of coating tools 706. Each coating tool may comprise a spray applicator 802 and a coating material reservoir 1206 containing a specific coating material (see FIG. 12B). Each coating tool may be automatically attached to the robot 914 (not shown) using a tool changer.

The sensor device 706 may be housed inside an enclosure 1204 to avoid contamination of the sensor device during the spraying procedure, which produces spraying mist that might contaminate the sensor device 708. The robot 914 may be configured to open the enclosure and to remove the sensor device from the enclosure 1204 with the use of a tool changer.

FIG. 12B illustrates a zoom-in on the tool rack and the enclosure housing the sensor system shown in FIG. 12A. The tool rack may contain a plurality of coating tools, such as 4 coating tools. Each coating tool may contain a spray applicator 802 described in relation to FIG. 8 above and a coating material reservoir 1206. The coating material reservoir may contain a specific coating material which may be prepared, for example, by mixing different materials, such as pigment pastes, base varnish, thinner, hardener, in the reservoir or by mixing said materials in a mixing device and filling the resulting coating material into the reservoir. The respective coating tool may be picked up by the robot 914 based on instructions provided by robot controller 912.

The present disclosure has been described in conjunction with a preferred embodiment as examples as well. However, other variations can be understood and effected by those persons skilled in the art and practicing the claimed invention, from the studies of the drawings, this disclosure and the claims. Notably, it is not required that the different steps are performed at a certain place or at one node of a distributed system, i.e. each of the steps may be performed at a different nodes using different equipment/data processing units.

As used herein "determining" also includes "initiating or causing to determine", "generating", "querying", "accessing", "correlating", "matching", "selecting" also includes "initiating or causing to generate, access, query, correlating, select and/or match" and "providing" also includes "initiating or causing to determine, generate, access, query, correlating, select and/or match, send and/or receive". "Initiating or causing to perform an action" includes any processing signal that triggers a computing processor to perform the respective action.

In the claims as well as in the description the word "comprising" or "including" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A computer-implemented method for generating robot path data for robot path(s) to be followed by a robot comprising a coating tool during coating at least part of the surface of at least one spatial substrate with at least one coating material, said method comprising:

(a) providing via a communication interface to at least one computer processor
spatial substrate data for each spatial substrate including substrate classification data and data being indicative of the geometry and the color of each spatial substrate, and
coating material data including data being indicative of a type of the at least one coating material and optionally of the order of the coating materials to be applied to the spatial substrate and/or data being indicative of the coating tool;

(b) optionally determining with the at least one computer processor whether each spatial substrate comprises at least one masking material based on the provided spatial substrate data;

(c) retrieving via the communication interface using the at least one computer processor,
coating tool parameter data based on the provided coating material data, said coating tool parameter data including coating tool tolerance data and at least one application parameter associated with the coating tool,
coating procedure data including a rule set for coating outer edges and edges adjacent to open space(s) and a rule set for coating main surfaces, and
substrate type data based on the provided spatial substrate data, said substrate type data including a rule set for each respective type of spatial substrate matching the substrate classification data;

(d) generating with the at least one computer processor tool path data for tool path(s) to be followed by the coating tool along the surface of each spatial substrate based on the data retrieved in step (c) and optionally the result of the determination performed in step (b);

(e) generating with the at least one computer processor the robot path data based on tool path data generated in step (d); and (f) providing the generated robot path data via the communication interface.

2. The method of claim 1, wherein the data being indicative of the geometry and color of each spatial substrate includes data representing each spatial substrate in three dimensional space.

3. The method of claim 1, wherein providing the spatial substrate data includes detecting, with the at least one computer processor, a user input being indicative of a substrate classification associated with each spatial substrate and a user input being indicative of the location of each spatial substrate within a workspace of the robot, determining, with the at least one computer processor, based on the detected user input, substrate classification data for each spatial substrate and the location of each spatial substrate within the workspace of the robot, providing via a communication interface to the at least one computer processor data of the workspace of the robot, determining, with the at least one computer processor, collision geometries present within said workspace based on the provided data of the workspace of the robot, determining, with the at least one computer processor, scan path data for scan path(s) to be followed by a scanning device along the surface of each spatial substrate based on the determined location of each spatial substrate within the workspace of the robot and the determined collision geometries, and providing, via the communication interface, the determined scan path data to the scanning device, and generating, with the at least one computer processor, the spatial substrate data for each spatial substrate by retrieving, via the communication interface, data being indicative of the geometry and color of the spatial substrate acquired by the scanning device based on the provided scan path data and combining the retrieved data at least with the determined respective substrate classification data.

4. The method of claim 1, wherein data indicative of the identity of the at least one coating material includes the name of each coating material type, the ID of each coating material type, or a combination thereof.

5. The method of claim 1, wherein the coating tool tolerance data includes target distance data, overlap percentage data, pattern size data, rotational tolerance(s) about the z-axis of the coating tool, rotational tolerance(s) about the x-axis of the coating tool, rotational tolerance(s) about the y-axis of the coating tool, or a combination thereof.

6. The method of claim 1, wherein the rule set for coating outer edges and edges adjacent to open space(s) comprises at least one algorithm for determining outer edges and at least one algorithm for determining edges adjacent to open space(s) present within the surface of the spatial substrate.

7. The method of claim 1, wherein the rule set for coating main surfaces includes rules for determining the start of the coating procedure, rules for coating direction, rules for rotation of coating tool within a tool path, rules for separation of surfaces, or a combination thereof.

8. The method of claim 1, wherein the at least one rule set for the type of spatial substrate matching the substrate classification data contained in the provided spatial substrate data includes at least one rule to coat edges adjacent to open space(s) for the respective type of spatial substrate, data on the required quality of the tool path(s), optionally at least one rule to coat open space(s) within the spatial substrate and optionally at least one rotational tolerance of the coating tool.

9. The method of claim 1, wherein generating tool path data for tool path(s) to be followed by the coating tool along the surface of each spatial substrate includes:

generating, with the at least one computer processor, a 3D model of each spatial substrate based on the provided spatial substrate data and optionally applying a rule set to smooth the surface of each generated 3D model, determining, with the computer processor, the outer edge(s), the edge(s) adjacent to open spaces, the main surfaces, and the open space(s) present within each spatial substrate based on the retrieved coating procedure parameter data, and the generated and optionally smoothed 3D model(s), generating, with the at least one computer processor, tool path data for outer edges and tool path data for edges adjacent to open space(s) based on the retrieved coating procedure data, the retrieved coating tool parameter data, the retrieved substrate type data, the determined outer edge(s), edge(s) adjacent to open spaces and open space(s), and the generated and optionally smoothed 3D model(s), generating, with the at least one computer processor, tool path data for main surfaces of each spatial substrate based on the retrieved coating procedure data, the retrieved coating tool parameter data, the determined main surfaces, and the generated and optionally smoothed 3D model(s), and optionally repeating said steps for at least one further coating material based on the retrieved coating procedure data and the retrieved coating tool parameter data associated with the at least one further coating material.

10. The method of claim 1, wherein generating robot path data includes determining collision geometries within a workspace of the robot based on the spatial substrate data and determining robot path data based on the determined collision geometries and the generated tool path data.

11. The method of claim 1, wherein generating robot path data further includes sorting, with the at least one computer processor and prior to generating robot path data, the generated tool path data such that the robot path(s) generated from the tool path data for outer edges and edges adjacent to open space(s) are performed prior to or after the robot path(s) generated from the tool path data for main surfaces and/or optimizing, with the computer processor, the generated or sorted robot path data.

12. A method of using the computer-implemented method of claim 1, the method comprising using the computer-implemented method for coating at least part of the surface of a spatial substrate with a coating material using a robotic system comprising a robot containing a coating tool.

13. The method of claim 1, wherein the data being indicative of the geometry and color of each spatial substrate includes data representing each spatial substrate in a three-dimensional point cloud of each spatial substrate, as well as color data of each spatial substrate.

* * * * *